US011934090B2

(12) United States Patent
Miller et al.

(10) Patent No.: US 11,934,090 B2
(45) **Date of Patent: *Mar. 19, 2024**

(54) CAMERA WITH FOLDED OPTICS HAVING MOVEABLE LENS

(71) Applicant: Apple Inc., Cupertino, CA (US)

(72) Inventors: Scott W. Miller, Los Gatos, CA (US); Alfred N. Mireault, Cambridge, MA (US); Brad V. Johnson, Santa Clara, CA (US); Nicholas D. Smyth, San Jose, CA (US); Rummel R. Adriano, Milpitas, CA (US); Shashank Sharma, San Francisco, CA (US); Steven Webster, Singapore (SG)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/221,620

(22) Filed: Apr. 2, 2021

(65) Prior Publication Data

US 2021/0223662 A1 Jul. 22, 2021

Related U.S. Application Data

(63) Continuation of application No. 16/244,030, filed on Jan. 9, 2019, now Pat. No. 10,969,652.

(Continued)

(51) Int. Cl.

*G03B 5/04* (2021.01)
*G03B 3/10* (2021.01)

(Continued)

(52) U.S. Cl.

CPC ................. *G03B 5/04* (2013.01); *G03B 3/10* (2013.01); *G03B 5/00* (2013.01); *G03B 13/36* (2013.01);

(Continued)

(58) Field of Classification Search

CPC .......... G02B 7/105; G02B 7/102; G02B 7/10; G02B 7/02; G02B 7/04; G02B 27/64;

(Continued)

(56) References Cited

U.S. PATENT DOCUMENTS

| | | |
|---|---|---|
| 2,649,022 A | 2/1953 | Angenieux |
| 7,274,518 B1 | 9/2007 | Tang et al. |

(Continued)

FOREIGN PATENT DOCUMENTS

| | | |
|---|---|---|
| CN | 103969915 A | 8/2014 |
| CN | 106094244 A | 11/2016 |

(Continued)

OTHER PUBLICATIONS

Xu, Zhaolin, et al., “Autofocusing system based on optical autocollimating for aerial camera,” Optical Instruments, Apr. 2011, pp. 52-56, vol. 33 No. 2.

(Continued)

*Primary Examiner* — Jie Lei

(74) *Attorney, Agent, or Firm* — Robert C. Kowert; Kowert, Hood, Munyon, Rankin & Goetzel, P.C.

(57) ABSTRACT

Various embodiments include a camera with folded optics and lens shifting capabilities. Some embodiments include voice coil motor (VCM) actuator arrangements to provide autofocus (AF) and/or optical image stabilization (OIS) movement. Some embodiments include suspension arrangements.

20 Claims, 20 Drawing Sheets

Related U.S. Application Data

(60) Provisional application No. 62/615,824, filed on Jan. 10, 2018.

(51) Int. Cl.

| | |
|---|---|
| ***G03B 5/00*** | (2021.01) |
| ***G03B 13/36*** | (2021.01) |
| ***G03B 17/17*** | (2021.01) |
| ***H02K 41/035*** | (2006.01) |
| ***H04N 5/225*** | (2006.01) |
| ***H04N 5/232*** | (2006.01) |
| ***H04N 23/54*** | (2023.01) |
| ***H04N 23/55*** | (2023.01) |
| ***H04N 23/57*** | (2023.01) |
| ***H04N 23/67*** | (2023.01) |
| ***H04N 23/68*** | (2023.01) |
| *H04M 1/02* | (2006.01) |

(52) U.S. Cl.
CPC ......... *G03B 17/17* (2013.01); *H02K 41/0356* (2013.01); *H04N 23/54* (2023.01); *H04N 23/55* (2023.01); *H04N 23/57* (2023.01); *H04N 23/67* (2023.01); *H04N 23/687* (2023.01); *G03B 2205/0015* (2013.01); *G03B 2205/0069* (2013.01); *H02K 2201/18* (2013.01); *H04M 1/0264* (2013.01)

(58) Field of Classification Search
CPC .......... G02B 27/646; G03B 5/04; G03B 3/10; G03B 5/00; G03B 13/36; G03B 17/17; G03B 2205/0015; G03B 2205/0069; H04N 5/2253; H04N 5/2254; H04N 5/2257; H04N 5/23212; H04N 5/23287; H04N 23/67; H04N 23/54; H04N 23/57; H04N 23/55; H04N 23/687; H04N 5/225; H04N 5/232; H02K 41/0356; H02K 41/035; H02K 2201/18; H04M 1/0264
USPC ............... 359/557, 554, 819, 823, 833, 850; 396/55, 75, 77, 52
See application file for complete search history.

(56) References Cited

U.S. PATENT DOCUMENTS

| | | | |
|---|---|---|---|
| 7,646,418 B2 | 1/2010 | Nanjo | |
| 8,014,080 B1 | 9/2011 | Chen et al. | |
| 8,599,495 B1 | 12/2013 | Tsai et al. | |
| 8,837,929 B2 | 9/2014 | Nomura et al. | |
| 9,172,856 B2 | 10/2015 | Bohn et al. | |
| 9,374,516 B2 | 6/2016 | Osborne | |
| 9,549,107 B2 | 1/2017 | Georgiev | |
| 9,733,458 B2 | 8/2017 | Georgiev et al. | |
| 9,829,684 B2 | 11/2017 | Shabtay et al. | |
| 9,973,680 B2 | 5/2018 | Osborne | |
| 10,036,895 B2 | 7/2018 | Avivi et al. | |
| 10,070,060 B2 | 9/2018 | Goldenberg et al. | |
| 10,156,706 B2 | 12/2018 | Shabtay et al. | |
| 10,288,897 B2 | 5/2019 | Bachar et al. | |
| 10,459,205 B2 | 10/2019 | Goldenberg | |
| 10,725,313 B2 | 7/2020 | Sugawara | |
| 10,969,652 B2 | 4/2021 | Miller et al. | |
| 11,061,213 B2 | 7/2021 | Yao et al. | |
| 11,092,773 B2 * | 8/2021 | Smyth | H04N 5/2257 |
| 2004/0141065 A1 | 7/2004 | Hara et al. | |
| 2006/0092524 A1 | 5/2006 | Konno | |
| 2012/0075728 A1 | 3/2012 | Takakubo et al. | |
| 2012/0249815 A1 | 10/2012 | Bohn et al. | |
| 2012/0314307 A1 | 12/2012 | Ikushima et al. | |
| 2013/0132044 A1 | 5/2013 | Paris | |
| 2013/0182336 A1 | 7/2013 | Hsu et al. | |
| 2013/0201559 A1 | 8/2013 | Minamisawa et al. | |
| 2013/0314307 A1 | 11/2013 | Lin et al. | |
| 2014/0218799 A1 | 8/2014 | Suzuka | |
| 2015/0103417 A1 | 4/2015 | Hiroshi et al. | |
| 2015/0110482 A1 | 4/2015 | Suzuka | |
| 2015/0198784 A1 | 7/2015 | Bone | |
| 2015/0286033 A1 | 10/2015 | Osborne | |
| 2015/0316748 A1 | 11/2015 | Cheo et al. | |
| 2015/0373252 A1 | 12/2015 | Georgiev | |
| 2016/0044247 A1 | 2/2016 | Shabtay et al. | |
| 2016/0266400 A1 | 9/2016 | Chan et al. | |
| 2016/0353008 A1 | 12/2016 | Osborne | |
| 2017/0038600 A1 | 2/2017 | Hee et al. | |
| 2017/0187962 A1 | 6/2017 | Lee et al. | |
| 2017/0329102 A1 | 11/2017 | Yuza et al. | |
| 2017/0359566 A1 | 12/2017 | Goma et al. | |
| 2017/0359568 A1 | 12/2017 | Georgiev et al. | |
| 2018/0017767 A1 | 1/2018 | Chen | |
| 2018/0017844 A1 | 1/2018 | Yu et al. | |
| 2018/0120674 A1 | 5/2018 | Avivi et al. | |
| 2018/0217475 A1 | 8/2018 | Goldenberg et al. | |
| 2018/0239162 A1 | 8/2018 | Lee et al. | |
| 2018/0267271 A1 | 9/2018 | Tseng | |
| 2018/0321504 A1 | 11/2018 | Hu | |
| 2019/0243112 A1 | 1/2019 | Yao et al. | |
| 2019/0086638 A1 | 3/2019 | Lee | |
| 2019/0094500 A1 | 3/2019 | Tseng et al. | |
| 2019/0196148 A1 | 6/2019 | Yao et al. | |
| 2019/0227199 A1 | 7/2019 | Kao | |
| 2019/0227406 A1 | 7/2019 | Wang et al. | |
| 2019/0235202 A1 | 8/2019 | Smyth et al. | |
| 2019/0377158 A1 | 12/2019 | Liao | |
| 2020/0057313 A1 | 2/2020 | Lee et al. | |
| 2020/0073140 A1 | 3/2020 | Eddington | |
| 2021/0058537 A1 | 2/2021 | Saito | |
| 2021/0333529 A1 | 10/2021 | Yao et al. | |
| 2021/0373279 A1 | 12/2021 | Smyth et al. | |

FOREIGN PATENT DOCUMENTS

| | | |
|---|---|---|
| CN | 106164732 A | 11/2016 |
| CN | 106164766 A | 11/2016 |
| CN | 205942054 U | 2/2017 |
| CN | 106576138 A | 4/2017 |
| CN | 107407849 A | 11/2017 |
| CN | 107533208 A | 1/2018 |
| CN | 107533273 A | 1/2018 |
| JP | 2009526257 | 7/2009 |
| JP | 2013125057 A | 6/2013 |
| JP | 2015179230 A | 10/2015 |
| KR | 10-20160030059 | 3/2016 |
| KR | 10-20160042066 | 4/2016 |
| KR | 20170105236 A | 9/2017 |
| KR | 10-2017-0128612 | 11/2017 |
| KR | 10-20170126993 | 11/2017 |
| KR | 20170128612 A | 11/2017 |
| KR | 10-20170141816 | 12/2017 |
| TW | 594037 | 4/2004 |
| WO | 2016024192 A2 | 2/2016 |
| WO | 2016207754 | 12/2016 |
| WO | 2017037688 | 3/2017 |
| WO | 2017084090 A1 | 5/2017 |
| WO | 2018007981 A1 | 1/2018 |
| WO | 2019140115 A1 | 7/2019 |

OTHER PUBLICATIONS

U.S. Appl. No. 16/258,377, filed Jan. 25, 2019, Nicholas D. Smyth, et al.

U.S. Appl. No. 16/264,463, filed Jan. 31, 2019, Yuhong Yao, et al.

U.S. Appl. No. 16/417,936, filed May 21, 2019, Shashank Sharma, et al.

International Search Report and Written Opinion from PCT/US2019/013089, (Apple Inc.), dated Mar. 7, 2019, pp. 1-13.

Korean Office Action from Korean Application No. 10-2022-7015254, dated Jan. 12, 2023, Apple, Inc., pp. 1-5.

Crop Factor Explained, 2011, pp. 1-8 [online], [retrieved on Oct. 20, 2022], retrieved from the Internet <URL: https://www.photographymad.

(56) References Cited

OTHER PUBLICATIONS com/pages/view/crop-factor-explain#:-:text=if%20you%20multiple%20a%20lens's, (or%20%22FLM%22).>, year 2011.
Sreesh Sudahakaran, "What is the 35mm Equivalent and Why is it Confusing?," 2014, pp. 1-6 [online], [retrieved on Jul. 5, 2022], retrieed from the Internet <URL:https://wolfcrow.com/what-is-the-35mm-equivalent-and-why-is-it-confusion/>. Year 2014.
Todd Vorenkamp, "Understanding Crop Factor," 2015, pp. 1-46 [online], [retrieved Nov. 9, 2022], retrieved from the Internet ,URL:https://www.phphotovideo.com/explora/photograpy/tips-and-solutions/understanding-crop-factor.. Year 2015.
Lens Image Circle, Aug. 1, 2019, pp. 1-2 [online], [retrieved Nov. 10, 2022], retrieved from the Internet, URL: https//sunex.com/2019/08/01/lens-image-circle/>. Yeaar 2019.
Tom Dempsey "Compare digital camera sensor sizes: 1"-Type, 4/3, APS-C, Full Frame 35 mm," 2015, Oct. 27, 2013, photoseek.com/21-3/compare-digittal-camera-sizes-full-frame-35mm-aps-c-micro-four-thirds-1-inch-type/, pp. 1-54.
Extended European Search Report from European Application No. 23151922.4, dated Sep. 8, 2023, pp. 1-9.
Office Action from Chinese Application No. 2022103124354, dated Jan. 20, 2024, pp. 1-11.

* cited by examiner

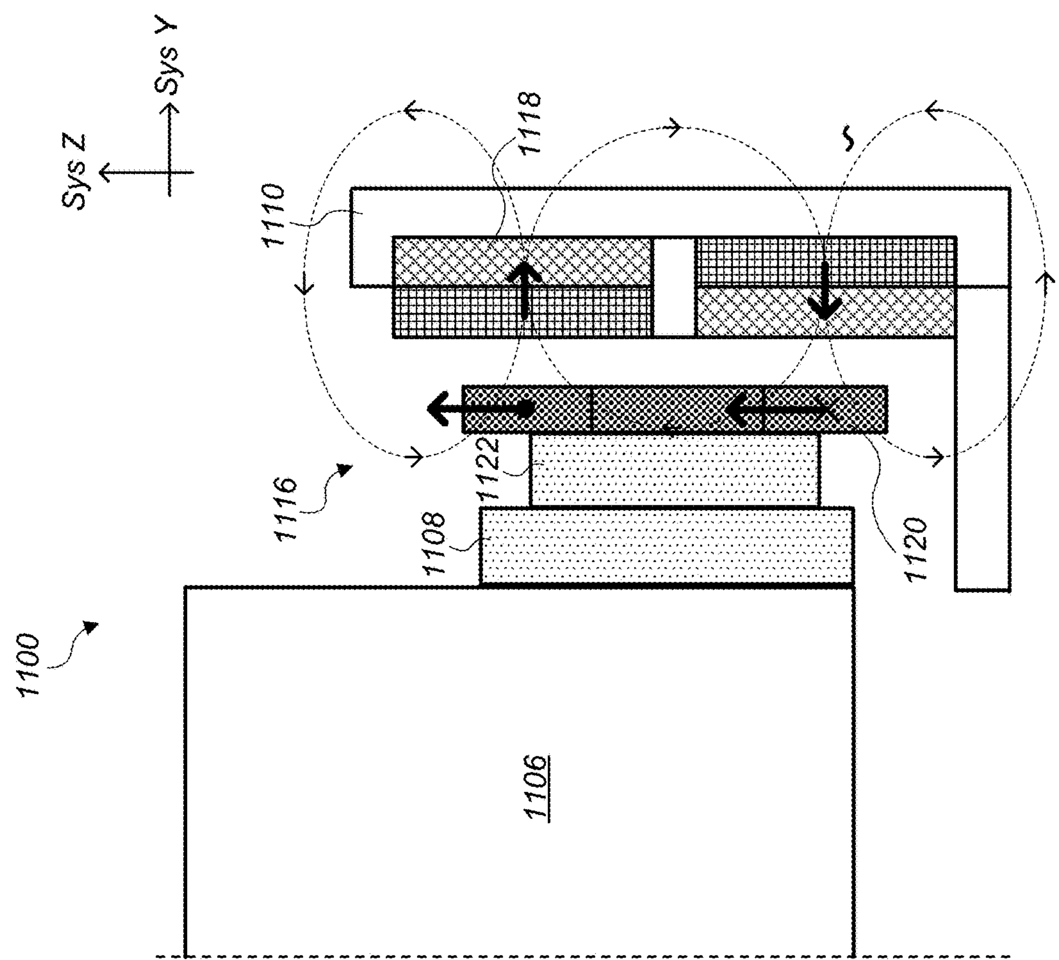
FIG. 11C
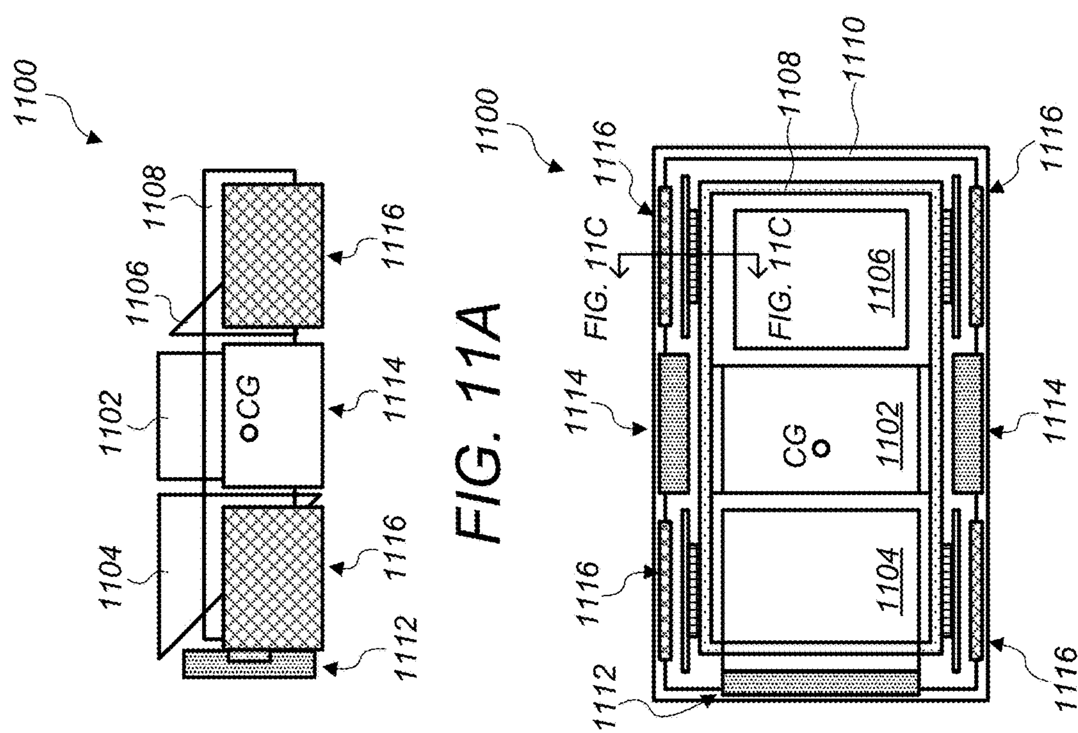
FIG. 11A
FIG. 11B

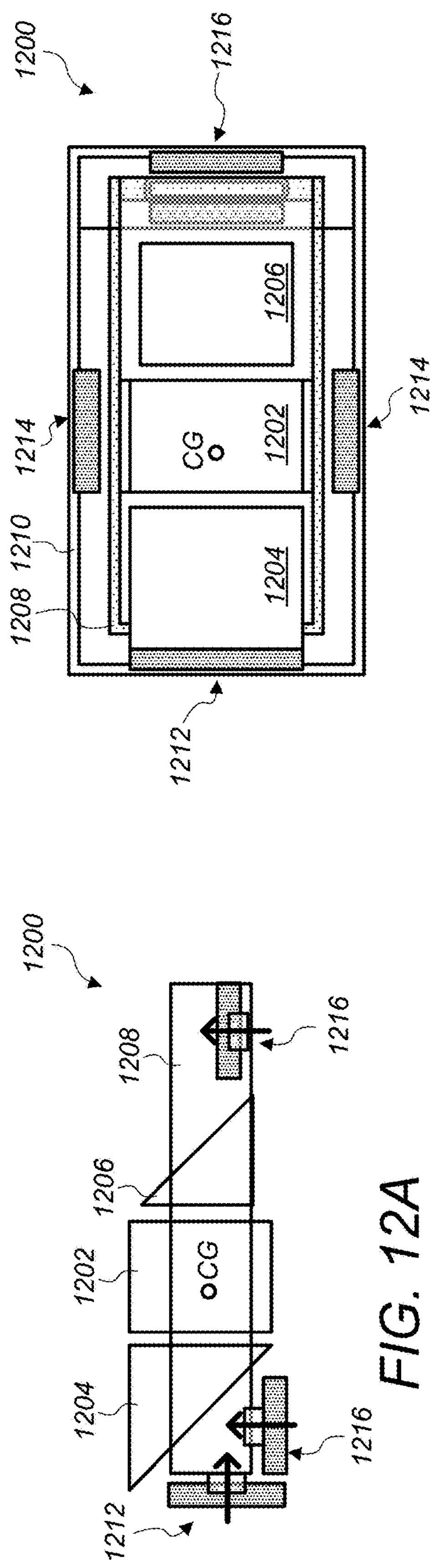
FIG. 12B
FIG. 12A
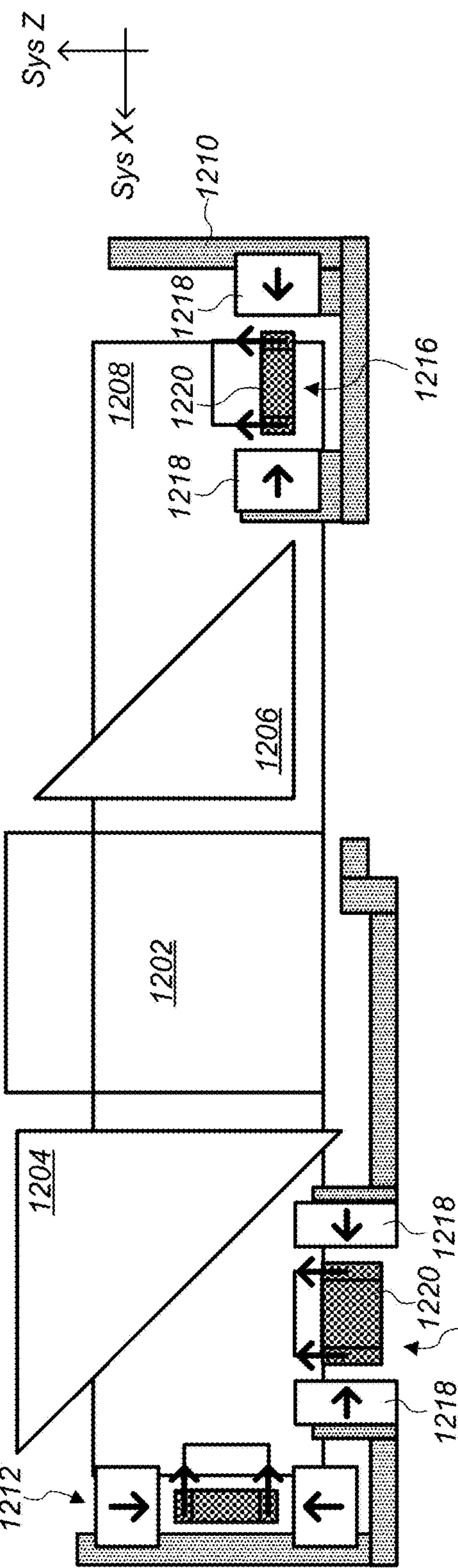
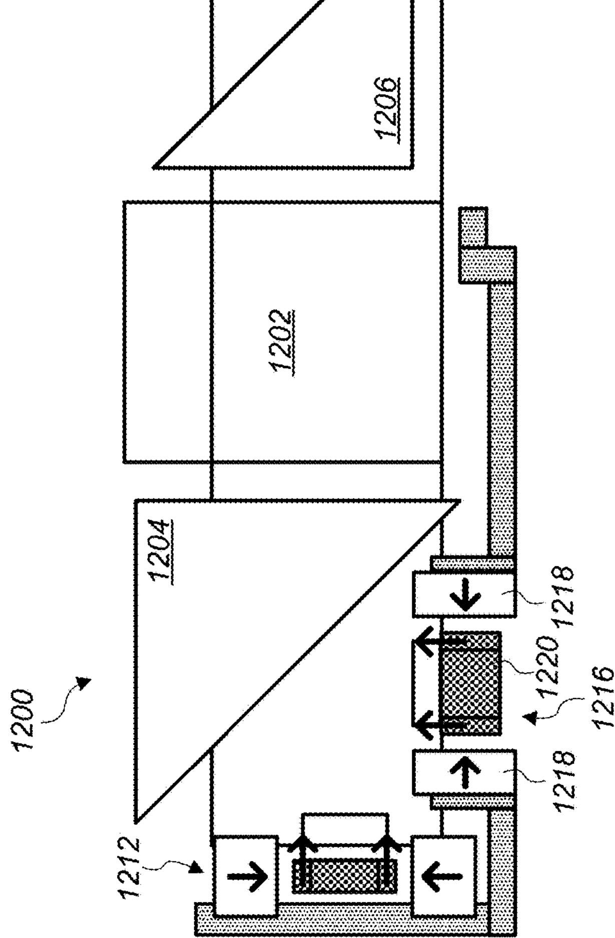
FIG. 12C

CAMERA WITH FOLDED OPTICS HAVING MOVEABLE LENS

This application is a continuation of U.S. patent application Ser. No. 16/244,030, filed Jan. 9, 2019, which claims benefit of priority to U.S. Provisional Application No. 62/615,824, filed on Jan. 10, 2018, which are hereby incorporated by reference in their entirety.

BACKGROUND

Technical Field

This disclosure relates generally to architecture for a camera with folded optics and lens shifting capabilities.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIG. 7A shows a top view of the suspension arrangement. FIG. 7B shows a top detail view of a corner portion of the suspension arrangement of FIG. 7A. FIG. 7C shows a perspective detail view of a corner portion of the suspension arrangement of FIG. 7A.

FIG. 8A shows a perspective view of the actuator arrangement. FIG. 8B shows a side cross-sectional view of the actuator arrangement. FIG. 8C shows a front cross-sectional view of the actuator arrangement. FIG. 8D shows a perspective view of magnets and coils of the actuator arrangement.

FIG. 9A shows a schematic side view of the actuator arrangement. FIG. 9B shows a schematic top view of the actuator arrangement. FIG. 9C shows a schematic cross-sectional view of the actuator arrangement.

FIG. 10A shows a schematic side view of the actuator arrangement. FIG. 10B shows a schematic top view of the actuator arrangement. FIG. 10C shows a schematic cross-sectional view of the actuator arrangement.

FIGS. 11A-11C each illustrate a respective schematic view of yet another example actuator arrangement for 3-axis shifting of a lens group within a folded optics arrangement of a camera, in accordance with some embodiments. FIG. 11A shows a schematic side view of the actuator arrangement. FIG. 11B shows a schematic top view of the actuator arrangement. FIG. 11C shows a schematic cross-sectional view of the actuator arrangement.

FIGS. 12A-12C each illustrate a respective schematic view of still yet another example actuator arrangement for 3-axis shifting of a lens group within a folded optics arrangement of a camera, in accordance with some embodiments. FIG. 12A shows a schematic side view of the actuator arrangement. FIG. 12B shows a schematic top view of the actuator arrangement. FIG. 12C shows a schematic cross-sectional view of the actuator arrangement.

FIG. 13A shows a schematic side view of the actuator arrangement. FIG. 13B shows a schematic top view of the actuator arrangement. FIG. 13C shows a schematic cross-sectional view of the actuator arrangement.

FIG. 14A shows a perspective view of the camera with a shield can covering at least a portion of the internal components of the camera. FIG. 14B shows a perspective view of the camera without the shield covering the internal components.

Figure 1:
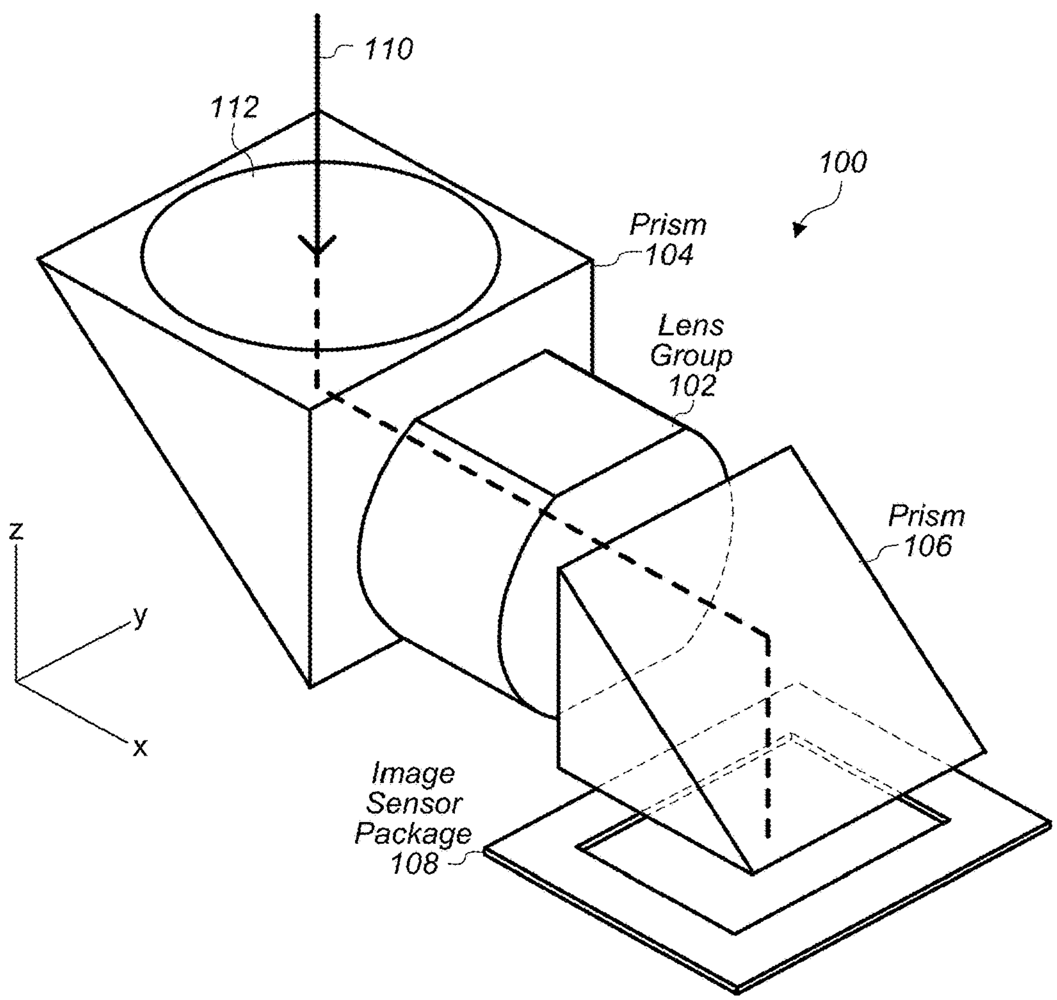
FIG. 1 illustrates a perspective view of an example camera with a folded optics arrangement, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include camera equipment outfitted with controls, magnets, and voice coil motors to improve the effectiveness of a miniature actuation mechanism for a compact camera module. More specifically, in some embodiments, compact camera modules include actuators to deliver functions such as autofocus (AF) and/or optical image stabilization (OIS). One approach to delivering a very compact actuator for AF and/or OIS is to use a voice coil motor (VCM) actuator.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Described here are folded optics arrangements for providing a reduced-height imaging system. The arrangements discussed throughout generally comprise one or more lenses positioned between two light path folding elements, which collectively provides a dual-folded light path. The one or more lenses may be moveable between the light path folding elements to provide autofocus and/or image stabilization during imaging. FIG. 1 shows a generalized example of a camera 100 with a folded optics arrangement. The example X-Y-Z coordinate system shown in FIG. 1 is used to discuss aspects of systems and/or system components, and may apply to embodiments described throughout this disclosure.

In various embodiments, the camera 100 may include a lens group 102, a first prism 104, a second prism 106, and an image sensor package 108. The lens group 102 may include one or more lens elements. In some embodiments, the lens group 102 may be located between the first prism 104 and the second prism 106, forming the folded optics arrangement. Light may follow an optical path 110 that is folded by the first prism 104 such that the light is directed towards the lens group 102, passes through the lens group 102, and is folded by the second prism 106 such that the light is directed towards the image sensor package 108. In some examples, light may enter an object side of the first prism 104 along the Z-axis. The first prism 104 may redirect the light to propagate along the X-axis (which may be parallel to an optical axis defined by the lens group 102) towards the lens group 102. The second prism 106 may redirect the light to propagate along the Z-axis (which may be orthogonal to a plane defined by the image sensor package 108), e.g., such that the light exits an image side of the second prism 106 towards the image sensor package 108. The first prism 104, the lens group 102, and/or the second prism 106 may be positioned along a common axis (e.g., the X-axis, the optical axis defined by the lens group 102, etc.). According to some examples, the optical path 110 may be contained within a plane (e.g., the X-Z plane), and the image sensor package 108 may extend along a different plane (e.g., the X-Y plane).

In some embodiments, the object side of the first prism 104 may extend along the X-Y plane. Furthermore, the first prism 104 may include a pair of opposing lateral sides that each extend along the X-Z plane, a lens group facing side that extends along the Y-Z plane, and a reflecting surface side that is angled relative to one or more of the other sides of the first prism 104. For example, the reflecting surface side of the first prism 104 may include a reflective surface that is angled so as to redirect light received from the object side of the first prism 104 towards the lens group 102 (via the lens group facing side of the first prism 104), as discussed above.

In some embodiments, the image side of the second prism 106 may extend along the X-Y plane, e.g., proximate the image sensor package 108. Furthermore, the second prism 106 may include a pair of opposing lateral sides that each extend along the X-Z plane, a lens group facing side that extends along the Y-Z plane, and a reflecting surface side that is angled relative to one or more of the other sides of the second prism 106. For example, the reflecting surface side of the second prism 106 may include a reflective surface that is angled so as to redirect light received from the lens group 102 (via the lens group facing side of the second prism 106) towards the image sensor package (via the image side of the second prism 106), as discussed above.

While the light path folding elements are shown in various figures as comprising prisms (e.g., the first prism 104 and the second prism 106), the camera systems and/or folded optics arrangements described herein may include any suitable light path folding element (e.g., a mirror or the like) or combination of elements. In some embodiments, one or more of the light path folding elements may also act as a lens element (or combination of lens elements). For example, one or more lens elements (e.g., other than those of the lens group 102) may be integrated with the first prism 104 (and/or the second prism 106) such that the prism acts as a lens element. Additionally, or alternatively, the first prism 104 (and/or the second prism 106) may be shaped such that the prism acts as a lens element.

Figure 2:
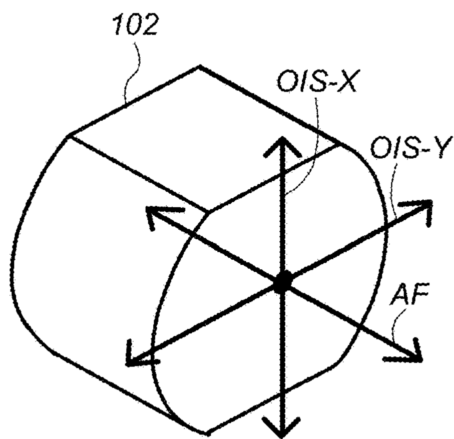
FIG. 2 illustrates an example of 3-axis movement of a lens group within a folded optics arrangement, in accordance with some embodiments.

As will be discussed in further detail below, the lens group 102 may be coupled with an actuator structure that is configured to move the lens group 102 along multiple axes, e.g., to provide autofocus (AF) and/or optical image stabilization (OIS) functionality. FIG. 2 shows an example of 3-axis movement of the lens group 102 to provide AF and/or OIS functionality. For example, the lens group 102 may be shifted (e.g., by an actuator structure, such as the actuator structures/arrangements discussed in further detail below) along the X-axis to provide AF movement. Additionally, or alternatively, the lens group 102 may be shifted along the Z-axis to provide OIS-X movement (e.g., movement that shifts the image projected on the image sensor package 108 in one or more directions parallel to the X-axis). Additionally, or alternatively, the lens group 102 may be shifted along the Y-axis to provide OIS-Y movement (e.g., movement that shifts the image projected on the image sensor package 108 in one or more directions parallel to the Y-axis). Components of the camera 100 (e.g., the lens group 102, the first prism 104, the second prism 106, and/or the image sensor package 108, etc.) may be used with any of the actuator arrangements described in the following figures.

Figure 3:
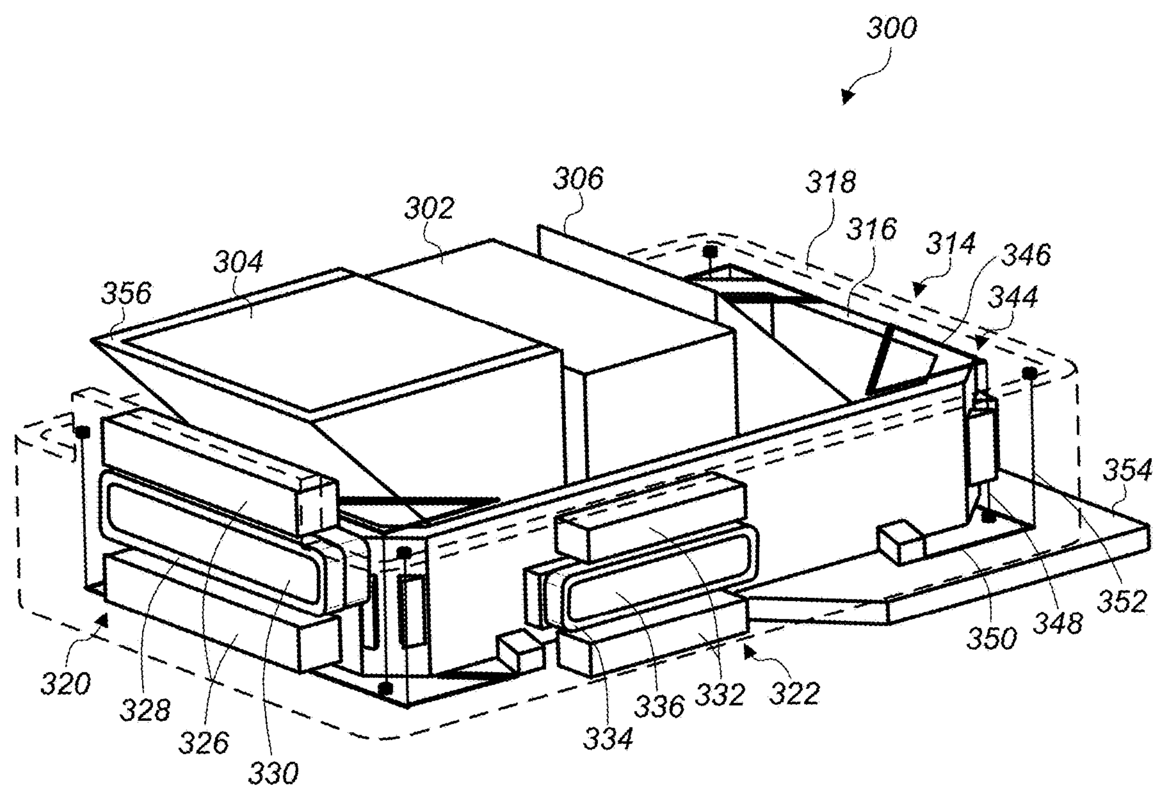
FIG. 3 illustrates a perspective view of an example camera with a folded optics arrangement, in accordance with some embodiments. The camera of FIG. 3 includes an example actuator arrangement for shifting a lens group of the camera along three axes, in accordance with some embodiments.
Figure 4:
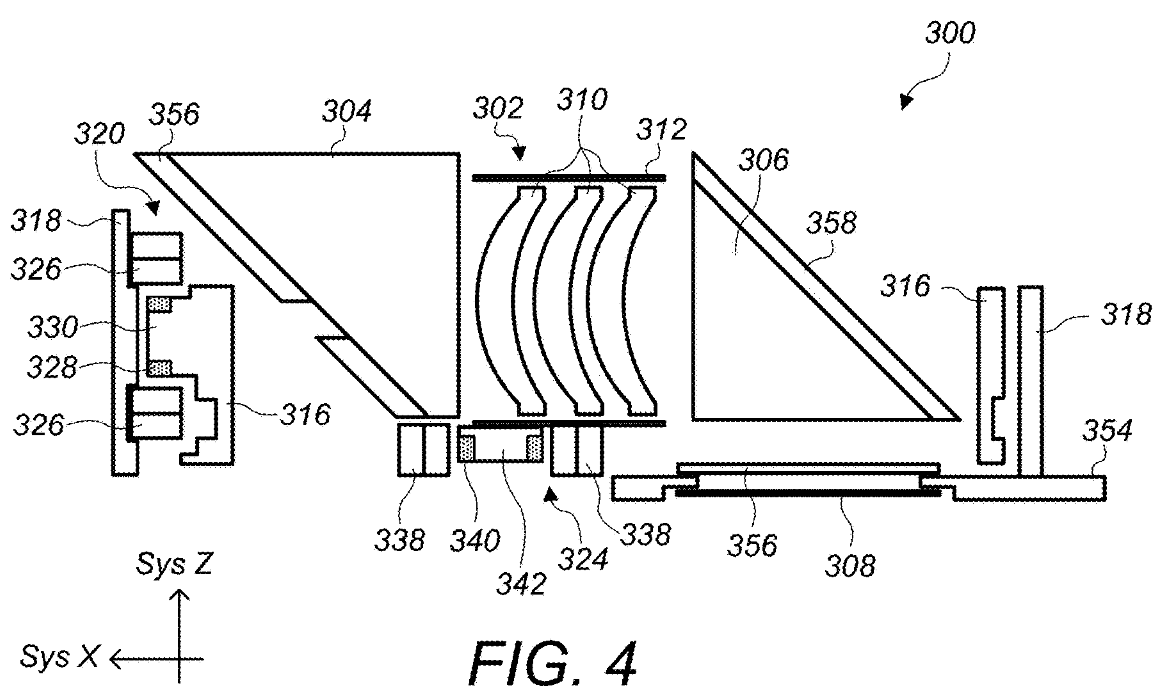
FIG. 4 illustrates a side cross-sectional view of the example camera of FIG. 3, in accordance with some embodiments.

As mentioned above, the camera systems described here may comprise an actuator system to move the lens group relative to the light path folding elements (e.g., the first prism 104 and the second prism 106). The actuator arrangements described here may generally comprise a frame (e.g., the carrier structure discussed below), one or more suspension structures for moveably holding the frame relative to the rest of the camera, and an actuator module for controlling movement of the frame. FIGS. 3 and 4 show perspective and side cross-sectional views of one such variation, and include an example camera 300 with a folded optics arrangement in accordance with some embodiments.

In some embodiments, the camera 300 may include a lens group 302, a first prism 304, and a second prism 306, and an image sensor 308. The lens group 302 may include one or more lens elements 310 disposed within a lens holder 312.

In various embodiments, the camera 300 may include an actuator module 314 that provides for shifting the lens group 302 along multiple axes, e.g., to provide AF and/or OIS movement. In some embodiments, the actuator module 314 may comprise a voice coil motor (VCM) actuator module that includes one or more VCM actuators, e.g., as shown in FIGS. 3 and 4.

In some examples, the actuator module 314 may include a carrier structure 316 and a fixed base structure 318. According to some embodiments, the carrier structure 316 may be attached to the lens group 302. In some examples, the carrier structure 316 may be attached to the lens group 302, and movement of the carrier structure 316 (e.g., due to actuation of one or more actuators of the actuator module 314) may cause movement of the lens group 302, such that the lens group 302 moves together with the carrier structure 316.

In various embodiments, the carrier structure 316 may extend around the first prism 304, the lens group 302, and the second prism 306, e.g., as shown in FIG. 3. The carrier structure 316 may define a periphery within which at least a respective portion of each of the first prism 304, the lens group 302, and the second prism 306 are disposed. The carrier structure 316 may have multiple sides. For example, the carrier structure 316 may have a first side, a second side, a third side, and a fourth side. The first side may be a lateral side extending along the X-axis and along the side surfaces of the optical elements. The second side may be a lateral side extending along the X-axis and along the opposite side surfaces of the optical elements. The third side may be a distal/object side extending along the Y-axis, and may be positioned behind at least a portion of the reflecting surface side of the first prism 104 (e.g., such that the first prism 104 is disposed between the lens group 102 and the carrier structure 316). The fourth side may be a proximal/image side extending along the Y-axis, and may be positioned in front of at least a portion of the reflecting surface side of the second prism 106 (e.g., such that the second prism 106 is disposed between the lens group 102 and the carrier structure 316). While FIGS. 3 and 4 show the carrier structure 316 encircling the optical elements of the folded optics arrangement (e.g., the first prism 304, the lens group 302, and the second prism 306), it is understood that the carrier structure 316 may partially encircle the optical elements in some embodiments. As a non-limiting example, one of the sides of the carrier structure 316 may comprise two parts that are spaced apart from each other by a gap, so that the carrier structure 316 partially encircles the optical elements. As another non-limiting example, the carrier structure 316 may comprise three sides (e.g., the carrier structure 316 may not include one of the four sides described above), so that the carrier structure 316 partially encircles the optical elements.

According to some embodiments, the fixed base structure 318 may include a component of the camera 300 to which the carrier structure 316 is moveably connected (e.g., via suspension elements). In some examples, the fixed base structure 318 may at least partially extend around the carrier structure 316. The fixed base structure 318 may be fixed (or static) relative to movement of the carrier structure 316. Furthermore, the fixed base structure 318 may be fixed relative to the first prism 304, the second prism 306, and/or the image sensor 308. The fixed base structure 318 may be spaced apart from the carrier structure 316 to allow for movement (e.g., AF and/or OIS movement) of the carrier structure 316 within a periphery defined by the fixed base structure 318. In some examples, the fixed base structure 318 may include multiple components that are joined or otherwise fixed relative to each other.

In various embodiments, the actuator module 314 may include one or more AF VCM actuators and/or one or more OIS VCM actuators. In some embodiments, the actuator module 314 may include an AF VCM actuator 320 (e.g., to provide AF movement), an OIS-Y VCM actuator 322 (e.g., to provide OIS-Y movement), and an OIS-X VCM actuator 324 (e.g., to provide OIS-X movement).

The AF VCM actuator 320 may include one or more magnets and one or more coils. In some examples, the AF VCM actuator 320 may include a pair of AF magnets 326 and an AF coil 328. The AF coil 328 may be electrically driven to magnetically interact with the AF magnets 326 to produce Lorentz forces that move the AF coil 328, the carrier structure 316, and/or the lens group 302 along an axis (e.g., along axis 202 of FIG. 2) to provide AF movement of the lens group 302. The AF magnets 326 may be attached to the fixed base structure 318. The AF coil 328 may be attached to the carrier structure 316 (e.g., to the distal/object side of the carrier structure 316). According to some embodiments, the AF coil 328 may extend from the carrier structure 316 such that the AF coil 328 is nested between the AF magnets 326. In some cases, the AF coil 328 may be attached to a protrusion 330 of the carrier structure 316, and the protrusion 330 may extend toward the AF magnets 326. In some instances, the AF coil 328 may be wound around the protrusion 330. In some embodiments, the AF coil 328 may have a long axis that is parallel to respective long axes of the AF magnets 326. In various embodiments, the AF VCM actuator 320 may be tucked within a space under a portion of the first prism 304, e.g., as indicated in FIGS. 3 and 4. In this manner, the impact of the AF VCM actuator 320 on the dimension of the system along its long axis (also referred to herein as the "system X-axis") and along its vertical axis (also referred to herein as the "system Z-axis") may be reduced or eliminated.

The OIS-Y VCM actuator 322 may include one or more magnets and one or more coils. In some examples, the OIS-Y VCM actuator 322 may include a pair of OIS-Y magnets 332 and an OIS-Y coil 334. The OIS-Y coil 334 may be electrically driven to magnetically interact with the OIS-Y magnets 332 to produce Lorentz forces that move the OIS-Y coil 334, the carrier structure 316, and/or the lens group 302 along an axis (e.g., along axis 206 of FIG. 2) to provide OIS-Y movement of the lens group 302. The OIS-Y magnets 332 may be attached to the fixed base structure 318. The OIS-Y coil 334 may be attached to the carrier structure 316 (e.g., to a lateral side of the carrier structure 316). According to some embodiments, the OIS-Y coil 334 may extend from the carrier structure 316 such that the OIS-Y coil 334 is nested between the OIS-Y magnets 332. In some cases, the OIS-Y coil 334 may be attached to a protrusion 336 of the carrier structure 316, and the protrusion 336 may extend toward the OIS-Y magnets 332. In some instances, the OIS-Y coil 334 may be wound around the protrusion 336. In some embodiments, the OIS-Y coil 334 may have a long axis that is parallel to respective long axes of the OIS-Y magnets 332. While a single OIS-Y VCM actuator 322 is shown in FIG. 3, it should be understood that various embodiments may include multiple OIS-Y VCM actuators. For instance, the camera 300 may include a second OIS-Y VCM actuator opposite (e.g., with respect to the lens group 302) the first OIS-Y VCM actuator 322 depicted in FIG. 3.

The OIS-X VCM actuator 324 may include one or more magnets and one or more coils. In some examples, the OIS-X VCM actuator 324 may include a pair of OIS-X magnets 338 and an OIS-X coil 340. The OIS-X coil 340 may be electrically driven to magnetically interact with the OIS-X magnets 338 to produce Lorentz forces that move the OIS-X coil 340, the carrier structure 316, and/or the lens group 302 along an axis (e.g., along axis 204 of FIG. 2) to provide OIS-X movement of the lens group 302. The OIS-X magnets 338 may be attached to the fixed base structure 318. The OIS-X coil 340 may be attached to the carrier structure 316 and/or the lens holder 312. According to some embodiments, the OIS-X coil 340 may extend from the carrier structure 316 such that the OIS-X coil 340 is nested between the OIS-X magnets 338. In some cases, the OIS-X coil 340 may be attached to a protrusion 342 of the carrier structure 316, and the protrusion 342 may extend toward the OIS-X magnets 338. In some instances, the OIS-X coil 340 may be wound around the protrusion 342. In some embodiments, the OIS-X coil 340 may have a long axis that is parallel to respective long axes of the OIS-X magnets 338.

In some embodiments, the camera 300 may include a suspension mechanism 344 (or "suspension arrangement") from which the carrier structure 316 may be suspended relative to the fixed base structure 318. The suspension mechanism 344 may provide compliance and/or stiffness for controlled movement of the carrier structure 316. According to some examples, the suspension mechanism 344 may include a set of one or more top springs 346 (e.g., leaf springs) attached to respective top corner portions of the carrier structure 316. Furthermore, a respective suspension wire 348 may extend downward from each of the top springs 346. A bottom end portion of the respective suspension wire 348 may be attached to a fixed (or static) structure. Additionally, or alternatively, the suspension mechanism 344 may include a set of one or more bottom springs 350 attached to respective bottom corner portions of the carrier structure 316. Furthermore, a respective suspension wire 352 may extend upward from each of the bottom springs 350. A top end portion of the respective suspension wire 352 may be attached to a fixed (or static) structure. In some embodiments, the top and/or bottom springs may provide compliance for OIS-X movement in a controlled manner, and may provide sufficient stiffness to resist Z-axis movement of the lens group 302 during OIS-Y and/or AF movement. Furthermore, the suspension wires may provide compliance for OIS-Y and/or AF movement in a controlled manner, and may provide sufficient stiffness to resist X-Y plane movement of the lens group during OIS-X movement. Various non-limiting example suspension arrangements are described in greater detail below with reference to FIGS. 5-7C.

In various embodiments, the camera 300 may include a substrate 354 below the second prism 306. The image sensor 308 may be coupled with the substrate 354. In some embodiments, a filter 356 (e.g., an infrared filter) may also be coupled to the substrate 354. For instance, the filter 356 may be located above the image sensor 308 such that light passes through the filter 356 before reaching the image sensor 308.

In some embodiments, the camera 300 may include a first prism holder 356 that holds the first prism 304. In some embodiments, the first prism 304 may be attached to one or more fixed (or static) structures of the camera 300 via the first prism holder 356. For instance, the first prism holder 356 may be attached to a shield can (not shown) in some cases. Additionally, or alternatively, the camera 300 may include a second prism holder 358 that holds the second prism 306. In some embodiments, the second prism 306 may be attached to one or more fixed (or static) structures of the camera 300 via the second prism holder 358. For instance, the second prism holder 358 may be attached to the shield can in some cases.

Figure 5:
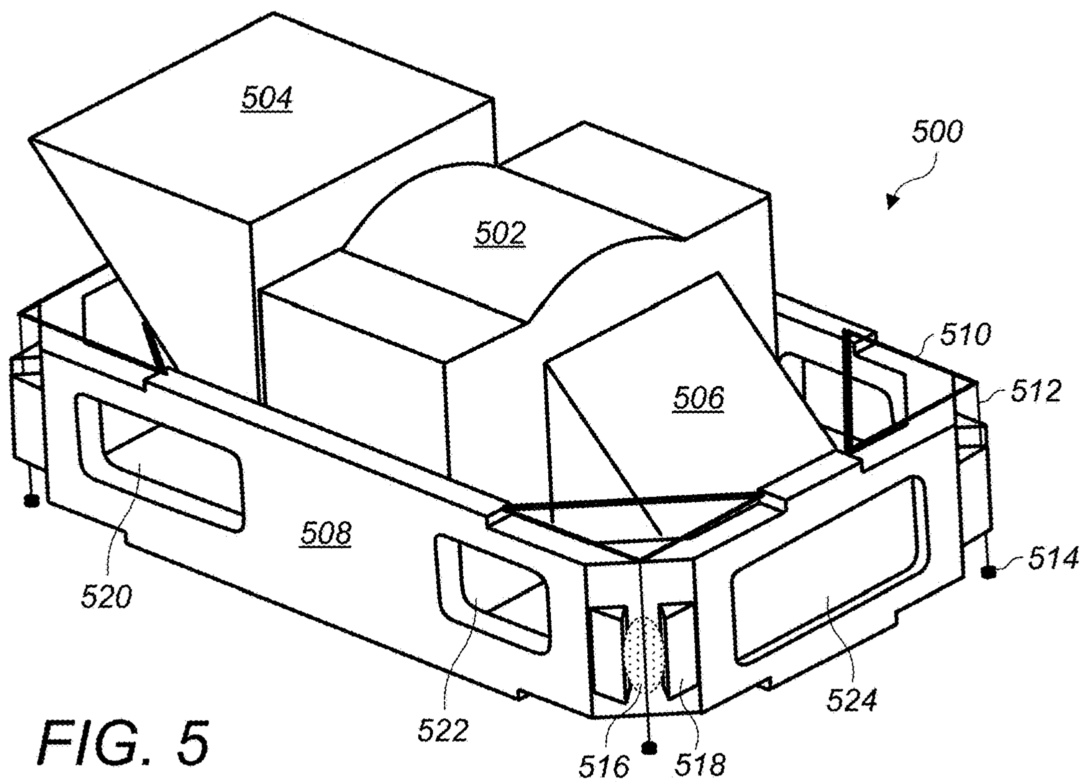
FIG. 5 illustrates a perspective view of an example suspension arrangement for a camera with a folded optics arrangement, in accordance with some embodiments.

The suspension arrangements described here may generally include one or more springs (e.g., leaf springs), one or more wires (e.g., suspension wires), and/or one or more flexure arms. FIGS. 5-7C show various example suspension arrangements that may be used with any of the camera systems and/or actuator arrangements described herein. Although shown in FIGS. 3 and 4 as having a suspension arrangement comprising top (or "upper") springs and bottom (or "lower") springs, the suspension arrangement need not include both. For example, FIG. 5 illustrates a perspective view of an example suspension arrangement 500 (e.g., for a camera with a folded optics arrangement) that may have one or more top springs and one or more wires extending downward from the top spring(s).

In some embodiments, the camera may include a lens group 502, a first prism 504, and a second prism 506. In various embodiments, the camera may include an actuator module that provides for shifting the lens group 502 along multiple axes, e.g., to provide AF and/or OIS movement. In some examples, the actuator module may include a carrier structure 508 and a fixed base structure (e.g., the fixed base structure 318 of FIG. 3). According to some embodiments, the carrier structure 508 may be attached to the lens group 502. For instance, the carrier structure 508 may be attached to the lens group 502 such that the lens group 502 moves together with the carrier structure 508. In various embodiments, the carrier structure 508 may extend around the first prism 504, the lens group 502, and the second prism 506, e.g., as shown in FIG. 5. The carrier structure 508 may define a periphery within which at least a respective portion of each of the first prism 504, the lens group 502, and the second prism 506 are disposed.

In various embodiments, the suspension arrangement 500 may include a set of one or more top springs 510 attached to respective top corner portions of the carrier structure 508. Furthermore, a respective suspension wire 512 may extend downward from each of the top springs 510. A bottom end portion 514 of the respective suspension wire 512 may be attached to a fixed (or static) structure.

In some embodiments, the camera and/or the suspension arrangement 500 may include a damper that dampens movement of one or more of the suspension wires 512. For instance, the suspension wires 512 may be at least partially disposed within a viscoelastic material 516 (e.g., a viscoelastic gel). In some examples, one or more protrusions 518 may protrude from the carrier structure 508 and form one or more pockets within which the viscoelastic material 516 may be disposed. In some instances, the viscoelastic material 516 may be injected into a pocket through a hole in the base structure (not shown) that surrounds the carrier structure 508. For example, an insertion needle (not shown) may be inserted through the hole in the base structure to access the pocket and inject the viscoelastic material 516 into the pocket. In some embodiments, the protrusions 518 may extend from corner portions of the carrier structure 508, e.g., as shown in FIG. 5. While FIG. 5 shows protrusions 518 that form pockets configured to contain, at least in part, the viscoelastic material 516, it should be understood that the viscoelastic material 516 may be disposed within pockets formed differently, e.g., via pockets formed of protrusions from a structure other than the carrier structure 508, pockets formed via a combination of the carrier structure 508 and one or more other structures, etc. The viscoelastic material 516 may be located along any portion(s) of the length of a suspension wire 512. In some embodiments, the viscoelastic material 516 may be located along a central portion of the length of a suspension wire 512.

In some embodiments, the carrier structure 508 may define one or more cutout portions and/or one or more recessed portions, e.g., for weight reduction and/or mass balancing purposes. In some examples, the cutout portion(s) and/or recessed portion(s) may be positioned so as to reduce weight in certain areas to appropriately distribute weight, e.g., in camera systems that are not symmetric in one or more directions. For instance, it may be desirable to distribute the weight of components of a camera system in a manner that avoids undesirable moments about the center of gravity of the lens group 502. In some examples, the weight reduction may increase system responsiveness to actuation of the actuator module and/or may improve energy efficiency (e.g., by reducing the required amount of drive current to the coils). In the example illustrated in FIG. 5, the carrier structure 508 defines cutout portions 520 that oppose one another with respect to the first prism 504. Furthermore, the carrier structure 508 defines cutout portions 522 that oppose one another with respect to the second prism 506. Furthermore, the carrier structure 508 defines a recessed portion 524 proximate the second prism 506. In some instances, the cutout portion(s) and/or the recessed portion(s) may be located and/or sized to reduce or eliminate moments (e.g., caused by actuation forces) about a center of gravity of the lens group 502 and/or the carrier structure 508. Any of the carrier structures described above and below (e.g., with reference to FIGS. 3, 4, 7A-7C, 8B, 8C, and 9A-15) may include one or more cutout portions and/or one or more recessed portions in some embodiments. Additionally, or alternatively, the cutout portion(s) and/or the recessed portion(s) may be used with any suspension arrangement described herein.

Figure 6A:
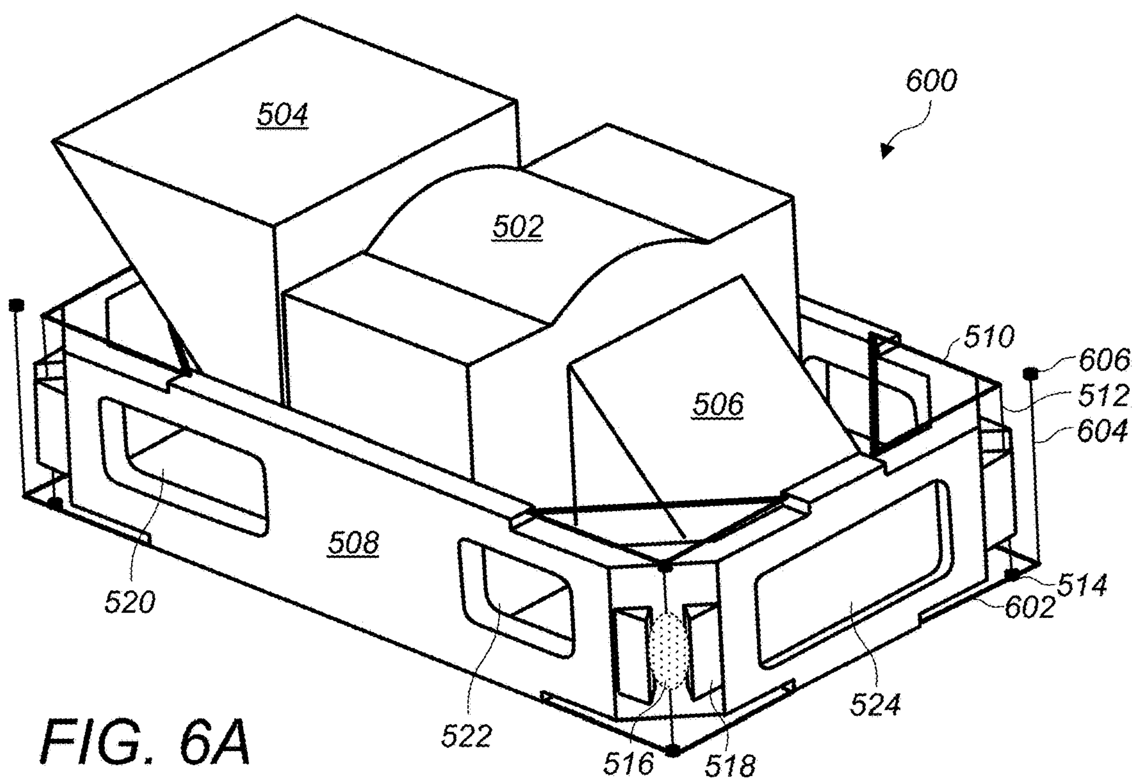
FIG. 6A illustrates a perspective view of another example suspension arrangement for a camera with a folded optics arrangement, in accordance with some embodiments.

FIG. 6A illustrates a perspective view of another example suspension arrangement 600 (e.g., for a camera with a folded optics arrangement) that may have one or more top (or "upper") springs and one or more bottom (or "lower") springs. One or more wires may extend downward from the top spring(s). Furthermore, one or more wires may extend upward from the bottom spring(s). While the suspension arrangement 600 is described as having top and bottom springs, the suspension arrangement 600 may include one or more additional features (that may not be shown in FIG. 6A) in some embodiments.

In various embodiments, the suspension arrangement 600 may include a set of one or more top springs 510 attached to respective top corner portions of the carrier structure 508. Furthermore, a respective suspension wire 512 may extend downward from each of the top springs 510. A bottom end portion 514 of the respective suspension wire 512 may be attached to a fixed (or static) structure.

Figure 6B:
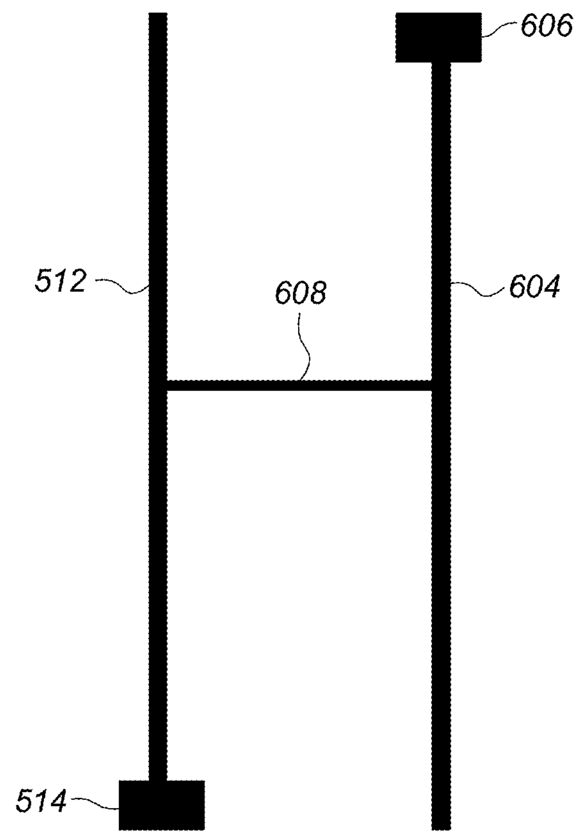
FIG. 6B illustrates an example brace connecting two suspension wires that may be used in a suspension arrangement for a camera with a folded optics arrangement, in accordance with some embodiments.

Furthermore, the suspension arrangement 600 may include a set of one or more bottom springs 602 attached to respective bottom corner portions of the carrier structure 508. Furthermore, a respective suspension wire 604 may extend upward from each of the bottom springs 602. A top end portion 606 of the respective suspension wire 604 may be attached to a fixed (or static) structure. In some embodiments, one or more of the suspension wires 604 may be coupled with a corresponding suspension wire 512 (e.g., a suspension wire 512 that extends downward from a top spring 510 at a same corner portion) via a respective brace to limit relative movement between the corresponding suspension wires 512 and 604 in one or more degrees of freedom. For example, as indicated in FIG. 6B, the brace 608 may be a structure that connects the corresponding suspension wires 512 and 604 at their midpoints (e.g., midpoints along the directions in which the suspension wires 512 and 604 extend). However, it should be understood that the brace 608 may additionally or alternatively connect the suspension wires 512 and 604 at one or more other portions of the wires. In various embodiments, due to the brace 608, the corresponding suspension wires 512 and 604 may maintain a constant relative distance from each other at the portion(s) in which they are connected by the brace 608.

In some embodiments the camera and/or the suspension arrangement 600 may include a damper that dampens movement of one or more of the suspension wires 512 and/or the suspension wires 604. For instance, the suspension wires 512, 604 may be at least partially disposed within a viscoelastic material 516 (e.g., a viscoelastic gel). In some examples, one or more protrusions 518 may protrude from the carrier structure 508 and form one or more pockets within which the viscoelastic material 516 may be disposed. In some examples, a pocket may be formed to contain viscoelastic material 516 that surrounds one or more portions of the suspension wire 512 and not the suspension wire 604, e.g., as illustrated in FIG. 6A. However, in some embodiments, the protrusions 508 may extend further out to form a larger pocket such that the viscoelastic material 516 within the larger pocket may surround both the suspension wire 512 and the suspension wire 604. In other embodiments, a separate pocket may be formed for each respective wire. For instance, a first pocket may be formed to contain viscoelastic material within which at least a portion of the suspension wire 512 may be disposed, and a second pocket may be formed to contain viscoelastic material within which at least a portion of the suspension wire 604 may be disposed.

Figure 7B:
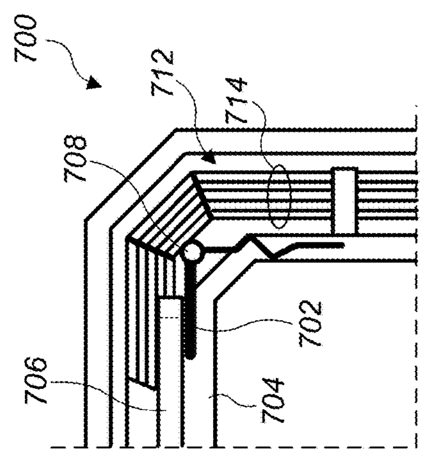
FIGS. 7A-7C each illustrate a respective view of yet another example suspension arrangement for a camera with a folded optics arrangement, in accordance with some embodiments.
Figure 7C:
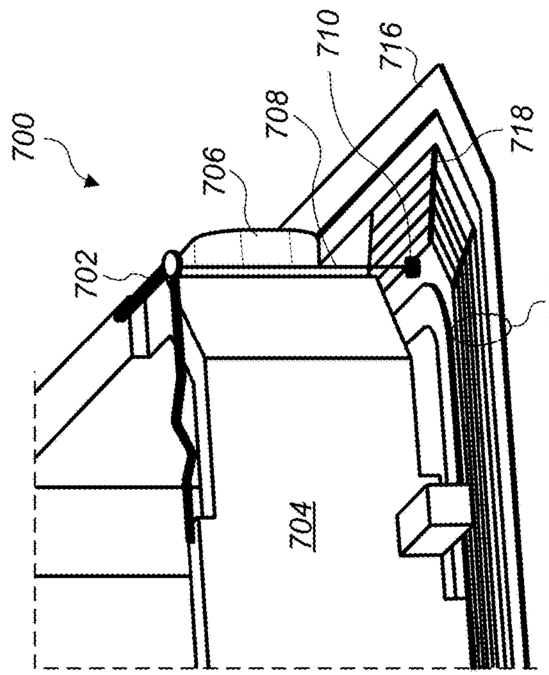
Figure 7A:
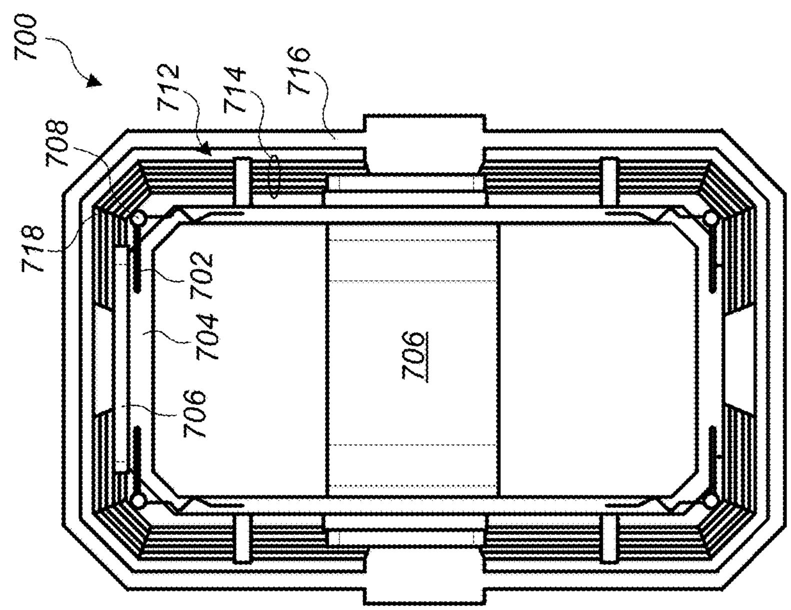

As mentioned above, some embodiments may include a suspension arrangement comprising flexure arms. FIGS. 7A-7C each illustrate a respective view of yet another example suspension arrangement 700 (e.g., for a camera with a folded optics arrangement) that may include such flexure arms. FIG. 7A shows a top view of the suspension arrangement 700. FIG. 7B shows a top detail view of a corner portion of the suspension arrangement 700 of FIG. 7A. FIG. 7C shows a perspective detail view of a corner portion of the suspension arrangement 700 of FIG. 7A.

According to various embodiments, the suspension arrangement 700 may include a combination of a spring-and-wire suspension mechanism (e.g., as discussed above with reference to FIGS. 3 and 5-6B) and a flexure suspension mechanism. For instance, the suspension arrangement 700 may include a set of one or more top springs 702 attached to respective top corner portions of a carrier structure 704. The carrier structure 704 may be attached to sides of a lens group 706, e.g., as shown in FIG. 7A. Furthermore, one or more coils 708 (e.g., coils of one or more VCM actuators) may be attached to the carrier structure 704. In some examples, a respective suspension wire 708 may extend downward from each of the top springs 702, e.g., as shown in FIGS. 7A-7C. A bottom end portion 710 of the respective suspension wire 708 may be attached to a fixed (or static) structure (e.g., a portion of the fixed base structure 716 not shown).

In some embodiments, the suspension arrangement 700 may include a bottom flexure suspension mechanism 712 attached to a lower portion (or bottom) of the carrier structure 704. The bottom flexure suspension mechanism 712 may include a set of one or more flexure arms 714 that is coupled with the carrier structure 704 and the fixed base structure 716 that surrounds the carrier structure 704. In some instances, the set of flexure arms 714 may be attached to an inner frame that is part of the carrier structure 704. In other instances, the inner frame may be a separate structure that is coupled with the carrier structure 704. Similarly, the set of flexure arms 714 may be attached to an outer frame that is part of the fixed base structure 706 in some instances. In other instances, the outer frame may be a separate structure that is coupled with the fixed base structure 706.

In some examples, the bottom flexure suspension mechanism 712 may include one or more flexure stabilizers 718 that connect adjacent flexure arms 714 with one another to prevent the connected flexure arms 714 from interfering (e.g., bumping, tangling, etc.) with one another during movement of the flexure arms 714. In various embodiments, the flexure arms 714 may extend parallel to one another. Furthermore, in some embodiments, the flexure stabilizers 718 may extend at an angle to (e.g., orthogonal to) the flexure arms 714.

Although in FIGS. 7A-7C the suspension arrangement 700 is shown as including a top spring 702 and a bottom flexure suspension mechanism 712, it should be understood that in various embodiments the suspension arrangement 700 may additionally, or alternatively, include a bottom spring and/or a top flexure suspension mechanism.

In some embodiments, a viscoelastic material may be disposed at one or more locations of the suspension arrangement 700 to dampen movement of one or more portions of the spring-and-wire suspension mechanism and/or the flexure suspension mechanism. For instance, one or more pockets may be formed by one or more structures (e.g., the carrier structure 704 and/or the fixed base structure 716), and the pocket(s) may be configured to at least partially be filled with the viscoelastic material such that the viscoelastic material at least partially surrounds one or more wires, one or more flexure arms, and/or one or more flexure stabilizers of the suspension arrangement 700.

Figure 8A:
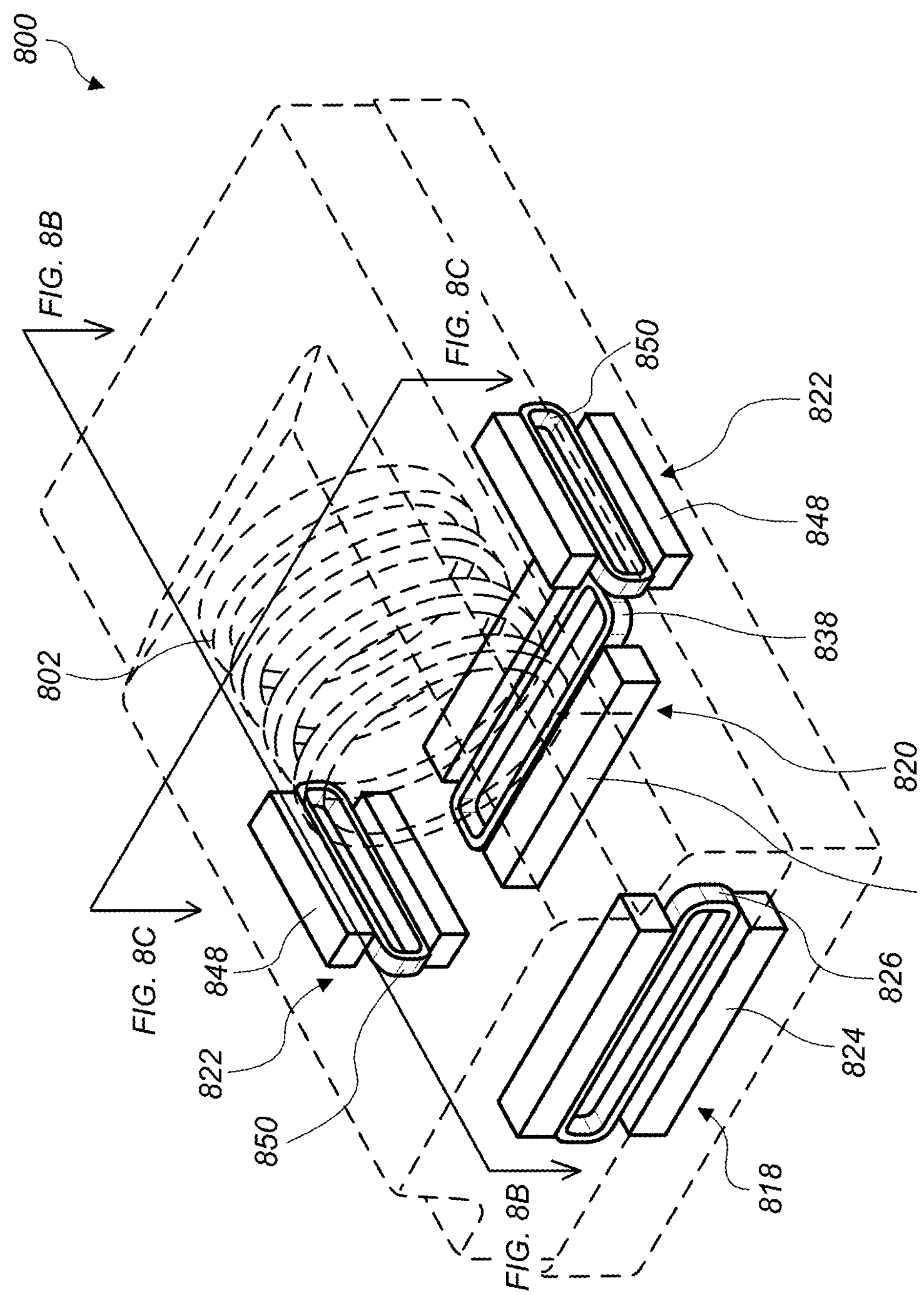
FIGS. 8A-8D each illustrate a respective view of an example actuator arrangement for 3-axis shifting of a lens group within a folded optics arrangement of a camera, in accordance with some embodiments.
Figure 8B:
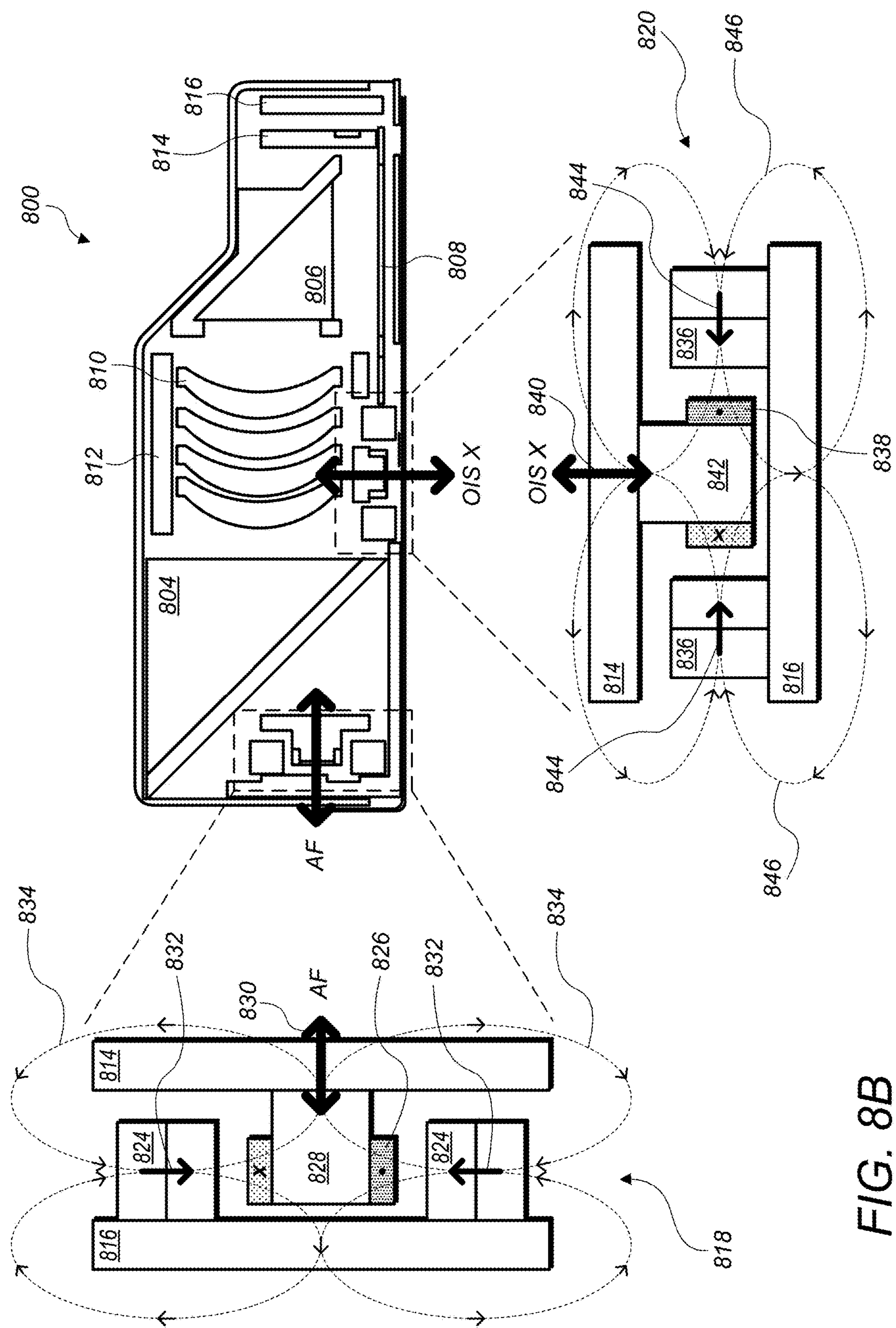
Figure 8C:
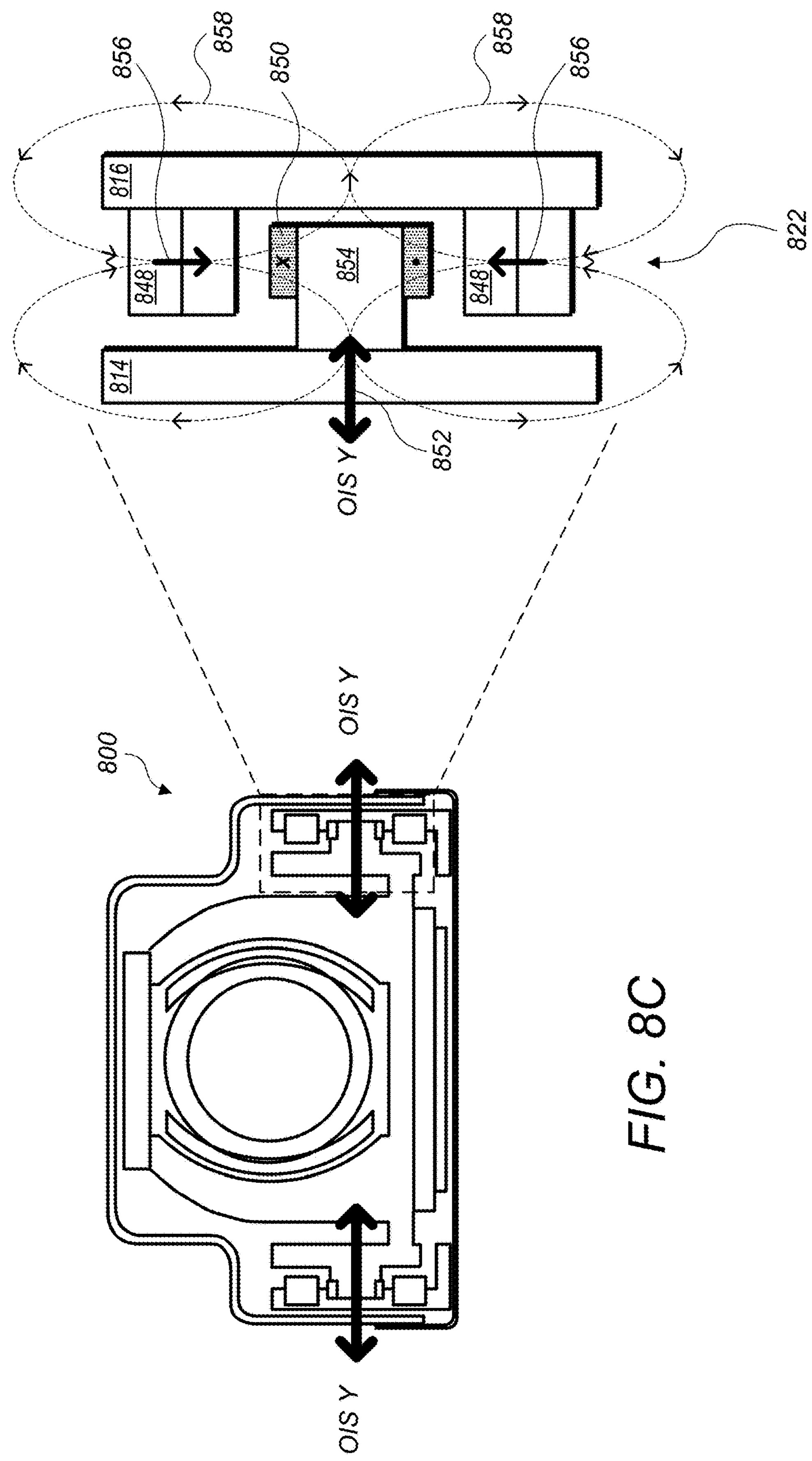
Figure 8D:
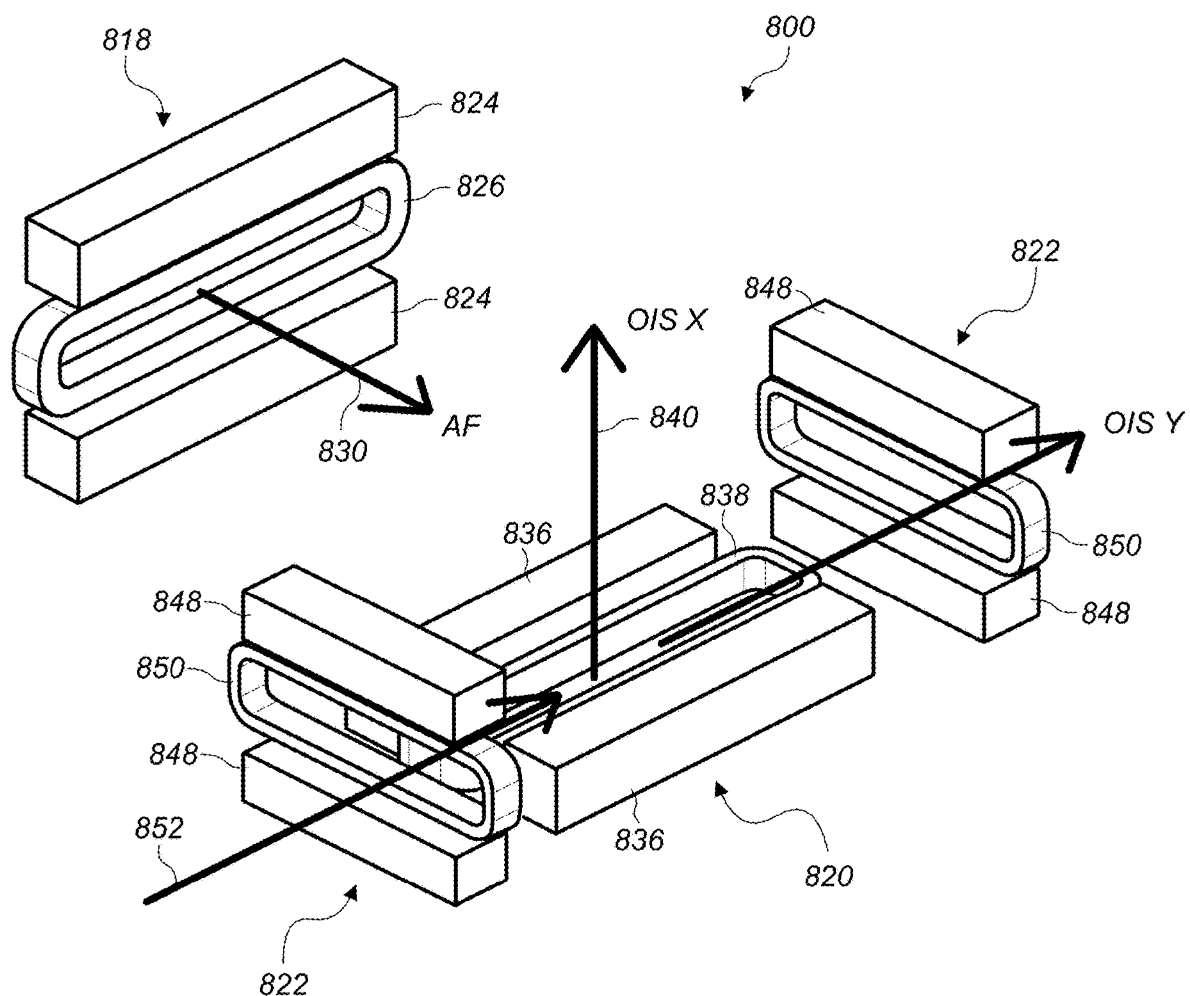

According to various embodiments, the camera systems described here may comprise actuator arrangements that may be used to move a carrier structure (which, as discussed above, may cause movement of a lens group). FIGS. 8A-13C show various example actuator arrangements that may be used with any of the camera systems, carrier structures, and/or suspension arrangements described above (e.g., with reference to FIGS. 3-7C). For instance, FIGS. 8A-8D each illustrate a respective view of an example actuator arrangement 800 for 3-axis shifting of a lens group within a folded optics arrangement of a camera. FIG. 8A shows a perspective view of the actuator arrangement 800. FIG. 8B shows a side cross-sectional view of the actuator arrangement 800. FIG. 8C shows a front cross-sectional view of the actuator arrangement 800. FIG. 8D shows a perspective view of magnets and coils of the actuator arrangement 800. The actuator arrangement 800 shown in FIGS. 8A-8D may be the same as, or similar to, the arrangement of actuator module 314 shown in FIGS. 3 and 4.

In various embodiments, the camera may include a lens group 802, a first prism 804, and a second prism 306, and an image sensor 808. The lens group 802 may include one or more lens elements 810 disposed within a lens holder 812. In various embodiments, the camera may include a carrier structure 814 and a fixed base structure 816. According to some embodiments, the carrier structure 814 may be attached to the lens group 802. For instance, the carrier structure 814 may be attached to the lens group 802 such that the lens group 802 moves together with the carrier structure 814. In various embodiments, the carrier structure 814 may extend around the first prism 804, the lens group 802, and the second prism 806. The carrier structure 814 may define a periphery within which at least a respective portion of each of the first prism 804, the lens group 802, and the second prism 806 are disposed.

In some embodiments, the fixed base structure 816 may extend around the carrier structure 814. The fixed base structure 816 may be fixed (or static) relative to movement of the carrier structure 814. The fixed base structure 816 may be spaced apart from the carrier structure 814 to allow for movement (e.g., AF and/or OIS movement) of the carrier structure 814 within a periphery defined by the fixed base structure 816.

In some embodiments, the actuator arrangement 800 may include one or more voice coil motor (VCM) actuators. For instance, the actuator arrangement 800 may include one or more autofocus (AF) VCM actuators and/or one or more optical image stabilization (OIS) VCM actuators. In some examples, the actuator arrangement 800 may include an AF VCM actuator 818 to provide AF movement, an OIS-X VCM actuator 820 to provide OIS-X movement, and an OIS-Y VCM actuator 822 to provide OIS-Y movement.

The AF VCM actuator 818 may include one or more magnets and one or more coils. In some examples, the AF VCM actuator 818 may include a pair of AF magnets 824 and an AF coil 826. The AF coil 826 may be electrically driven to magnetically interact with the AF magnets 824 to produce Lorentz forces that move the AF coil 826 the carrier structure 814, and/or the lens group 802 along an axis (e.g., in directions indicated by arrows 830 shown in FIGS. 8B and 8D) to provide AF movement of the lens group 802. The AF magnets 824 may be attached to the fixed base structure 816. The AF coil 826 may be attached to the carrier structure 814. According to some embodiments, the AF coil 826 may extend from the carrier structure 814 such that the AF coil 826 is nested between the AF magnets 824, e.g., as indicated in FIG. 8B. In some cases, the AF coil 826 may be attached to a protrusion 828 of the carrier structure 814, and the protrusion 828 may extend toward the AF magnets 824, e.g., to locate the AF coil 826 within a vertical space between the AF magnets 824. In some instances, the AF coil 826 may be wound around the protrusion 828. In some embodiments, the AF coil 826 may have a long axis that is parallel to respective long axes of the AF magnets 824. In various embodiments, the AF VCM actuator 818 may be tucked within a space under a portion of the first prism 804, e.g., as indicated in FIG. 8B. In this manner, the impact of the AF VCM actuator 818 on the dimension of the system along the system X-axis and along the system Z-axis may be reduced or eliminated.

In some embodiments, the AF magnets 824 may have opposite poling directions, e.g., as indicate in FIG. 8B by arrows 832. Furthermore, the AF magnets 824 may produce respective magnetic fields as indicated in FIG. 8B by magnetic field arrows 834. An example direction of current flow through the AF coil 826 is indicated in FIG. 8B using a cross (X) and a dot (●). The cross indicates current flowing "into the page," and the dot indicates current flowing "out of the page." This "cross and dot" convention for indicating example directions of current flow through coils is maintained throughout this disclosure.

In various embodiments, the AF coil 826 may be located within components of the magnetic fields produced by the AF magnets 824 that remain substantially constant in direction along a stroke of the AF coil 826.

The OIS-X VCM actuator 820 may include one or more magnets and one or more coils. In some examples, the OIS-X VCM actuator 820 may include a pair of OIS-X magnets 836 and an OIS-X coil 838. The OIS-X coil 838 may be electrically driven to magnetically interact with the OIS-X magnets 836 to produce Lorentz forces that move the OIS-X coil 838, the carrier structure 814, and/or the lens group 802 along an axis (e.g., in directions indicated by arrows 840 shown in FIGS. 8B and 8D) to provide OIS-X movement of the lens group 802. The OIS-X magnets 836 may be attached to the fixed base structure 816. The OIS-X coil 838 may be attached to the carrier structure 814. According to some embodiments, the OIS-X coil 838 may extend from the carrier structure 814 such that the OIS-X coil 838 is nested between the OIS-X magnets 836, e.g., as indicated in FIG. 8B. In some cases, the OIS-X coil 838 may be attached to a protrusion 842 of the carrier structure 814, and the protrusion 842 may extend toward the OIS-X magnets 836, e.g., to locate the OIS-X coil 838 within a horizontal space between the OIS-X magnets 836. In some instances, the OIS-X coil 838 may be wound around the protrusion 842. In some embodiments, the OIS-X coil 838 may have a long axis that is parallel to respective long axes of the OIS-X magnets 836.

In some embodiments, the OIS-X magnets 836 may have opposite poling directions, e.g., as indicate in FIG. 8B by arrows 844. Furthermore, the OIS-X magnets 836 may produce respective magnetic fields as indicated in FIG. 8B by magnetic field arrows 846.

In various embodiments, the OIS-X coil 838 may be located within components of the magnetic fields produced by the OIS-X magnets 836 that remain substantially constant in direction along a stroke of the OIS-X coil 838.

The OIS-Y VCM actuator 822 may include one or more magnets and one or more coils. In some examples, the OIS-Y VCM actuator 822 may include a pair of OIS-Y magnets 848 and an OIS-Y coil 850 to a first side of the lens group 802, and another pair of OIS-Y magnets 848 and another OIS-Y coil 850 to a second side of the lens group 802 that is opposite the first side. The OIS-Y coils 850 may be electrically driven to magnetically interact with the OIS-Y magnets 848 to produce Lorentz forces that move the OIS-Y coils 850, the carrier structure 814, and/or the lens group 802 along an axis (e.g., in directions indicated by arrows 852 shown in FIGS. 8C and 8D) to provide OIS-Y movement of the lens group 802. The OIS-Y magnets 848 may be attached to the fixed base structure 816. The OIS-Y coils 850 may be attached to the carrier structure 814. According to some embodiments, the OIS-Y coils 850 may extend from the carrier structure 814 such that respective OIS-Y coils 850 are nested between respective pairs of OIS-Y magnets 848. In some cases, each of the OIS-Y coils 850 may be attached to a respective protrusion 854 of the carrier structure 814, and the respective protrusion 854 may extend toward a respective pair of OIS-Y magnets 848. In some instances, each of the OIS-Y coils 850 may be wound around a respective protrusion 854. In some embodiments, each of the OIS-Y coils 850 may have a respective long axis that is parallel to respective long axes of the OIS-Y magnets 848.

In some embodiments, the OIS-Y magnets 848 may have opposite poling directions, e.g., as indicate in FIG. 8B by arrows 856. Furthermore, the OIS-Y magnets 848 may produce respective magnetic fields as indicated in FIG. 8B by magnetic field arrows 858.

In various embodiments, the OIS-Y coils 850 may be located within components of the magnetic fields produced by the OIS-Y magnets 848 that remain substantially constant in direction along respective strokes of the OIS-Y coils 850.

Figure 9C:
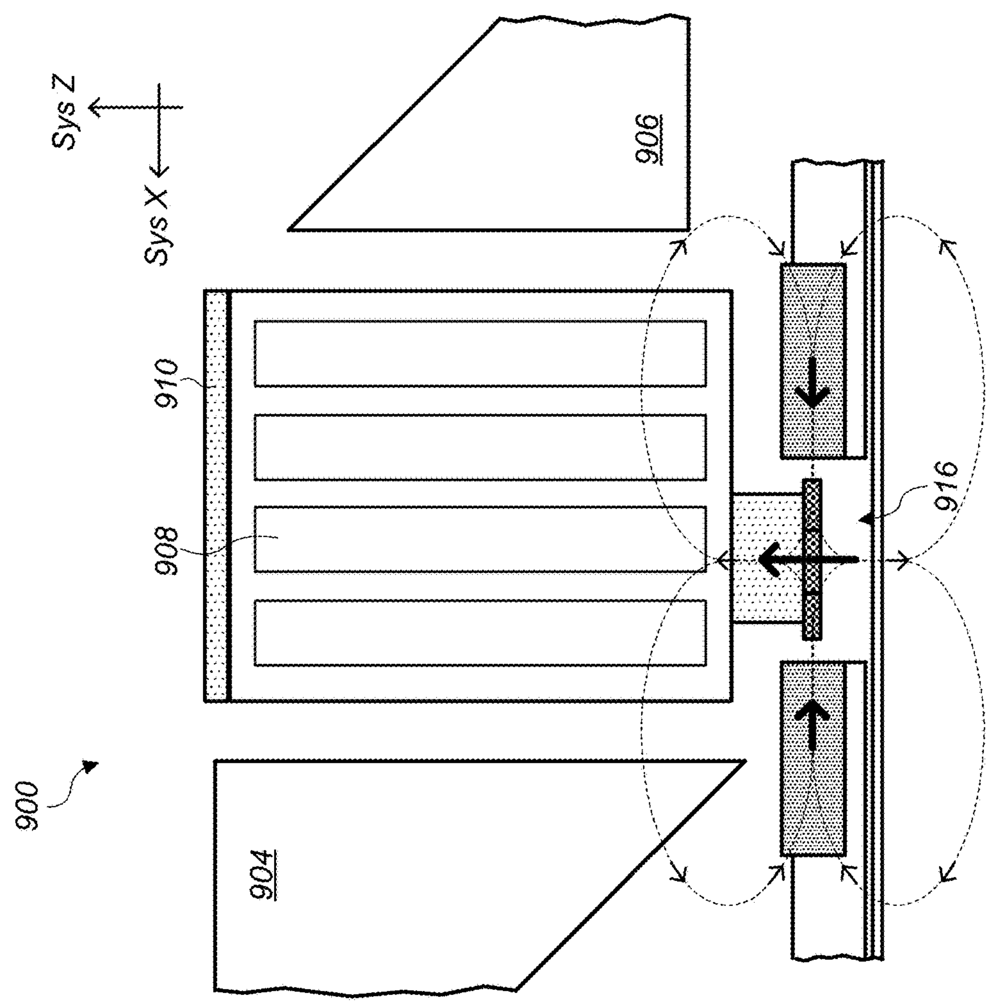
FIGS. 9A-9C each illustrate a respective schematic view of an example actuator arrangement for 3-axis shifting of a lens group within a folded optics arrangement of a camera, in accordance with some embodiments.
Figure 9A:
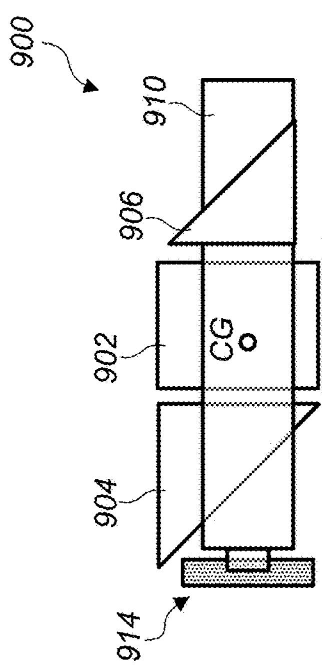
Figure 9B:
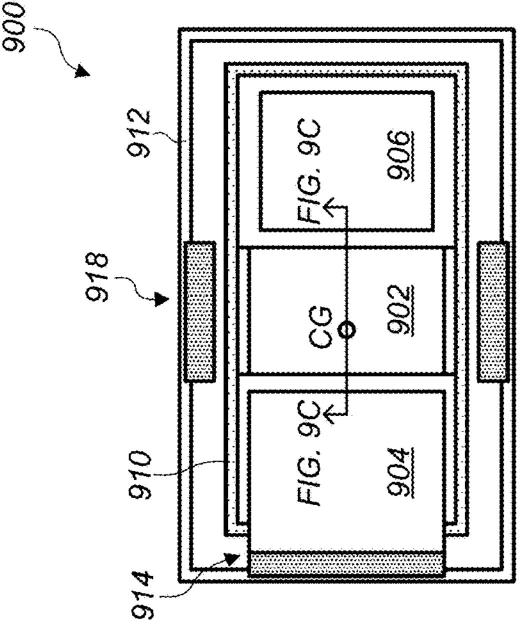

FIGS. 9A-9C illustrate schematic side, top, and cross-sectional views, respectively, of an example actuator arrangement 900 for 3-axis shifting of a lens group within a folded optics arrangement of a camera. The actuator arrangement 900 may be the same as, or similar to, the actuator arrangement 800 discussed above with reference to FIGS. 8A-8D. In FIGS. 9A-9C, arrows on the coils may represent example forces acting on the coils (e.g., Lorentz forces produced as a result of magnetic interaction between the coils and the magnets) and/or example directions of movement based on forces acting on the coils. Furthermore, arrows on the magnets may represent example poling directions of the magnets. These arrow conventions also apply to coils and magnets in FIGS. 10A-13C.

In various embodiments, the camera may include a lens group 902, a first prism 904, and a second prism 906. The lens group 902 may include one or more lens elements 908 disposed within a lens holder. In various embodiments, the camera may include a carrier structure 910 and a fixed base structure 912. In some embodiments, the actuator arrangement 900 may include an AF VCM actuator 914 to provide AF movement, an OIS-X VCM actuator 916 to provide OIS-X movement, and an OIS-Y VCM actuator 918 to provide OIS-Y movement.

Figure 10C:
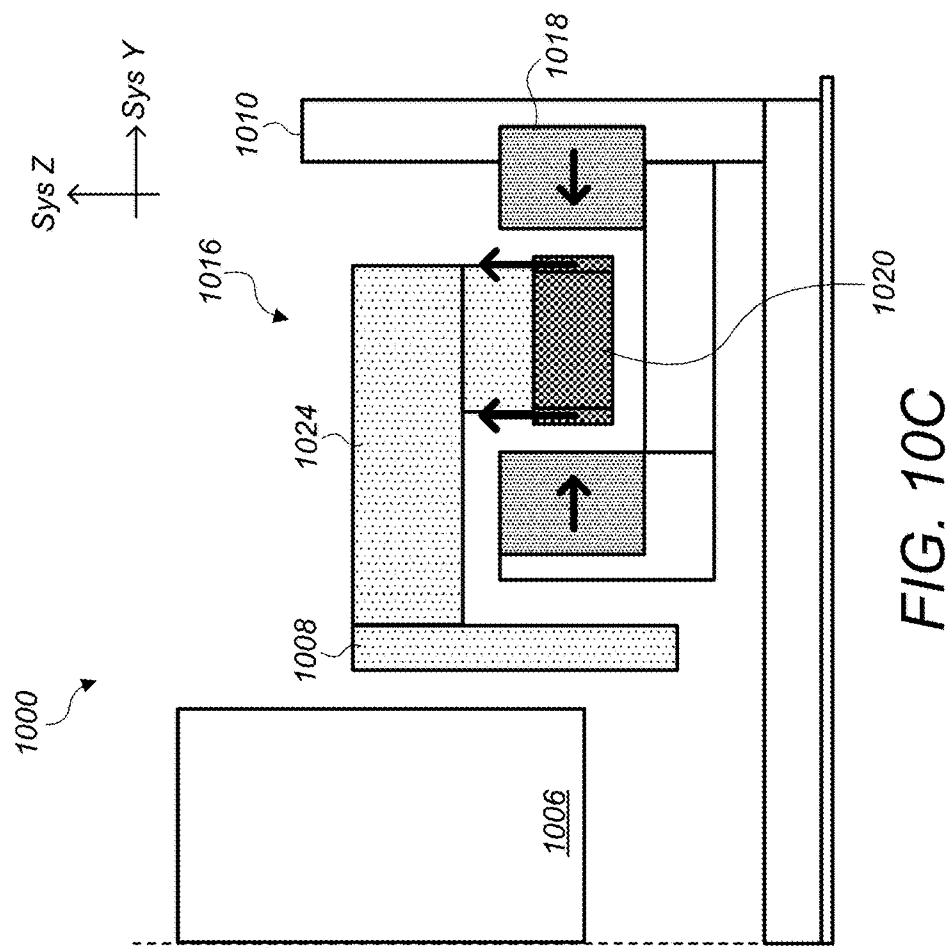
FIGS. 10A-10C each illustrate a respective schematic view of another example actuator arrangement for 3-axis shifting of a lens group within a folded optics arrangement of a camera, in accordance with some embodiments.
Figure 10A:
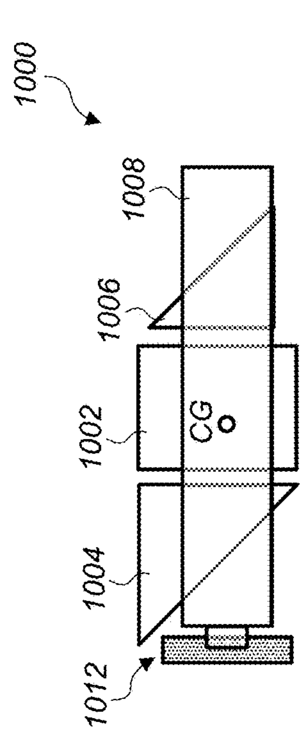
Figure 10B:
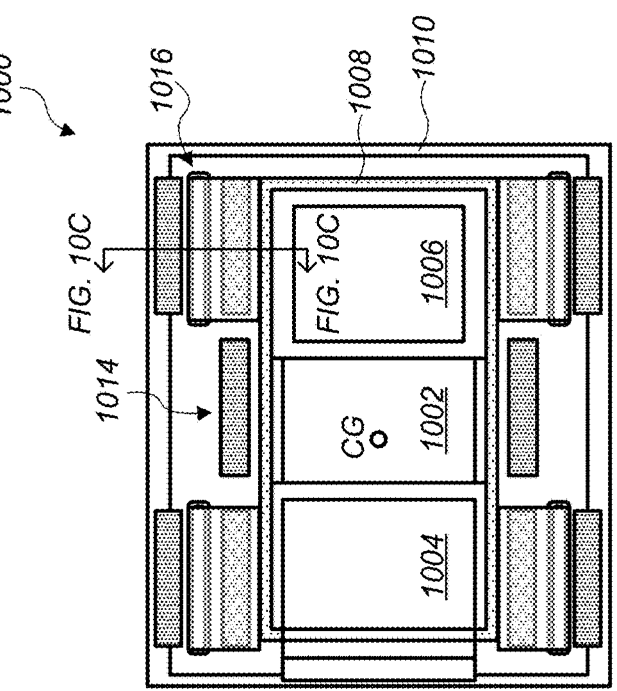

While some actuator arrangements described above may include an OIS-X VCM actuator located below the lens group, in some embodiments an actuator arrangement may include OIS-X VCM actuators located in corners of the camera system instead of below the lens group. For example, FIGS. 10A-10C each illustrate a respective schematic view of an example actuator arrangement 1000 (e.g., for 3-axis shifting of a lens group within a folded optics arrangement of a camera) that may include such corner OIS-X VCM actuators. FIG. 10A shows a schematic side view of the actuator arrangement 1000. FIG. 10B shows a schematic top view of the actuator arrangement 1000. FIG. 10C shows a schematic cross-sectional view of the actuator arrangement 1000.

In various embodiments, the camera may include a lens group 1002, a first prism 1004, and a second prism 1006. The lens group 1002 may include one or more lens elements disposed within a lens holder. In various embodiments, the camera may include a carrier structure 1008 and a fixed base structure 1010.

In some embodiments, the actuator arrangement 1000 may include an AF VCM actuator 1012 to provide AF movement. The AF VCM actuator 1012 may be configured like the AF VCM actuator 818 described above with reference to FIGS. 8A-8D.

In some embodiments, the actuator arrangement 1000 may include an OIS-Y VCM actuator 1014 to provide OIS-Y movement. The OIS-Y VCM actuator 1014 may be configured like the OIS-Y VCM actuator 822 described above with reference to FIGS. 8A-8D.

As mentioned above, the actuator arrangement 1000 may include corner OIS-X VCM actuators 1016. Rather than a single OIS-X VCM actuator being located below the lens group 1002 (e.g., as described above with reference to FIGS. 8A-8D), the corner OIS-X VCM actuators 1016 do not impact, or minimally impact, the dimension of the system along the system Z-axis. As shown in FIG. 10B, the actuator arrangement 1000 may include four corner OIS-X VCM actuators 1016 in some embodiments—each corner OIS-X VCM actuator 1016 being disposed proximate a respective corner of the carrier structure 1008 and/or the fixed base structure 1010.

As indicated in FIG. 10C, each corner OIS-X VCM actuator 1016 may include a pair of OIS-X magnets 1018 and an OIS-X coil 1020. The OIS-X magnets 1018 may be coupled to the fixed base structure 1010. In some examples, a first protrusion 1022 may extend from the fixed base structure 1010 towards the carrier structure 1008. The first protrusion 1022 may be part of the fixed base structure 1010 in some embodiments. In some embodiments, the first protrusion 1022 may be a structure that is attached to the fixed base structure 1010. One or both of the OIS-X magnets 1018 may be attached to or otherwise supported by the first protrusion 1022 and/or the fixed base structure 1010, e.g., as indicated in FIG. 10C. The OIS-X coil may be coupled to the carrier structure 1008. In some examples, a second protrusion 1024 may extend from the carrier structure 1008 towards the fixed base structure 1010 and towards the OIS-X magnets 1018. The OIS-X coil 1020 may be attached to an end portion of the second protrusion 1024 such that the OIS-X coil 1020 is located within a horizontal space between the OIS-X magnets 1018. That is, the OIS-X coil 1020 may be nested between the OIS-X magnets 1018.

In some actuator arrangements, corner OIS-X VCM actuators may comprise dual pole OIS-X magnets. For example, FIGS. 11A-11C each illustrate a respective schematic view of an example actuator arrangement 1100 (e.g., for 3-axis shifting of a lens group within a folded optics arrangement of a camera) that may include corner OIS-X VCM actuators having dual pole OIS-X magnets. FIG. 11A shows a schematic side view of the actuator arrangement 1100. FIG. 11B shows a schematic top view of the actuator arrangement 1100. FIG. 11C shows a schematic cross-sectional view of the actuator arrangement 1100.

In various embodiments, the camera may include a lens group 1102, a first prism 1104, and a second prism 1106. The lens group 1102 may include one or more lens elements disposed within a lens holder. In various embodiments, the camera may include a carrier structure 1108 and a fixed base structure 1110.

In some embodiments, the actuator arrangement 1100 may include an AF VCM actuator 1112 to provide AF movement. The AF VCM actuator 1112 may be configured like the AF VCM actuator 818 described above with reference to FIGS. 8A-8D.

In some embodiments, the actuator arrangement 1100 may include an OIS-Y VCM actuator 1114 to provide OIS-Y movement. The OIS-Y VCM actuator 1114 may be configured like the OIS-Y VCM actuator 822 described above with reference to FIGS. 8A-8D.

In some embodiments, the actuator arrangement 1100 may include corner OIS-X VCM actuators 1116. Rather than a single OIS-X VCM actuator being located below the lens group 1102 (e.g., as described above with reference to FIGS. 8A-8D), the corner OIS-X VCM actuators 1116 do not impact, or minimally impact, the dimension of the system along the system Z-axis. As shown in FIG. 11B, the actuator arrangement 1100 may include four corner OIS-X VCM actuators 1116 in some embodiments—each corner OIS-X VCM actuator 1116 being disposed proximate a respective corner of the carrier structure 1108 and/or the fixed base structure 1110.

As indicated in FIG. 11C, each corner OIS-X VCM actuator 1116 may include a pair of dual pole OIS-X magnets 1118 and an OIS-X coil 1120. The dual pole OIS-X magnets 1118 may be coupled to the fixed base structure 1110, e.g., as indicated in FIG. 11C. In some examples, the dual pole OIS-X magnets may be aligned along a vertical plane. In some embodiments, the OIS-X coil 1120 may be coupled to the carrier structure 1108. According to some examples, a protrusion 1122 may extend from the carrier structure 1108 towards the fixed base structure 1110 and towards the dual pole OIS-X magnets 1118. The OIS-X coil 1120 may be attached to an end portion of the protrusion 1122 such that the OIS-X coil 1120 is located proximate the dual pole OIS-X magnets 1118. In the actuator arrangement 1100, the OIS-X coil 1120 may not be nested between the dual pole OIS-X magnets 1118. As such, in some instances the OIS-X coils 1120 on one side of the system may move away from their corresponding dual pole OIS-X magnets 1118. Components of the magnetic fields produced by the corresponding dual pole OIS-X magnets 1118 may increasingly vary in direction as the OIS-X coils 1120 move away from the magnets. Accordingly, one or more of the corner OIS-X VCM actuators 1116 may be independently controlled in some embodiments. For instance, a first pair of corner OIS-X VCM actuators 1116 at a first side of the carrier structure 1108 may be controlled independently of a second pair of corner OIS-X VCM actuators 1116 at a second side of the carrier structure 1108 opposite the first side of the carrier structure 1108.

As mentioned above, various actuator arrangements may include an OIS-X VCM actuator located below the lens group (e.g., as indicated in the actuator arrangements described above with reference to FIGS. 8A-9C) or corner OIS-X VCM actuators located at corners of the camera system (e.g., as indicated in the actuator arrangements described above with reference to FIGS. 10A-11C). In some embodiments, an actuator arrangement may instead include one or more OIS-X VCM actuators behind the first prism and/or in front of the second prism. For example, FIGS. 12A-12C each illustrate a respective schematic view of an example actuator arrangement 1200 (e.g., for 3-axis shifting of a lens group within a folded optics arrangement of a camera) that may include such OIS-X VCM actuators. FIG. 12A shows a schematic side view of the actuator arrangement 1200. FIG. 12B shows a schematic top view of the actuator arrangement 1200. FIG. 12C shows a schematic cross-sectional view of the actuator arrangement 1200.

In various embodiments, the camera may include a lens group 1202, a first prism 1204, and a second prism 1206. The lens group 1202 may include one or more lens elements disposed within a lens holder. In various embodiments, the camera may include a carrier structure 1208 and a fixed base structure 1210.

In some embodiments, the actuator arrangement 1200 may include an AF VCM actuator 1212 to provide AF movement. The AF VCM actuator 1212 may be configured like the AF VCM actuator 818 described above with reference to FIGS. 8A-8D. In some embodiments, at least a portion of the AF VCM actuator 1212 may not be tucked under the first prism 1204, e.g., as indicated in FIG. 12C.

In some embodiments, the actuator arrangement 1200 may include an OIS-Y VCM actuator 1214 to provide OIS-Y movement. The OIS-Y VCM actuator 1214 may be configured like the OIS-Y VCM actuator 822 described above with reference to FIGS. 8A-8D.

In some embodiments, the actuator arrangement 1200 may include OIS-X VCM actuators 1216 to provide OIS-X movement. For instance, the actuator arrangement 1200 may include a first OIS-X VCM actuator 1216 below the first prism 1204, e.g., as indicated in FIGS. 12A and 12C. Furthermore, the actuator arrangement 1200 may include a second OIS-X VCM actuator 1216 proximate the second prism 1206, e.g., as indicated in FIGS. 12A-12C. Each of the OIS-X VCM actuators 1216 may include a pair of OIS-X magnets 1218 and an OIS-X coil 1220. The OIS-X magnets 1218 may be coupled to the fixed base structure 1210, and the OIS-X coil 1220 may be coupled to the carrier structure 1208. In various embodiments, the OIS-X coil 1220 may be nested between the OIS-X magnets 1218.

Figure 13B:
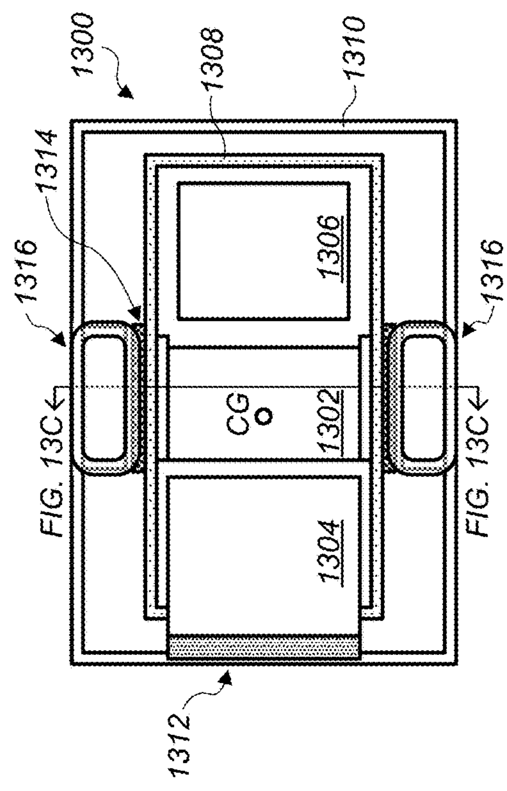
FIGS. 13A-13C each illustrate a respective schematic view of still yet another example actuator arrangement for 3-axis shifting of a lens group within a folded optics arrangement of a camera, in accordance with some embodiments.
Figure 13A:
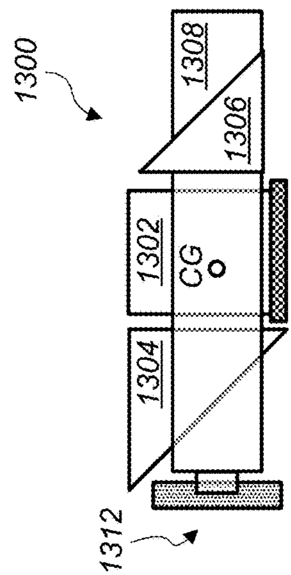
Figure 13C:
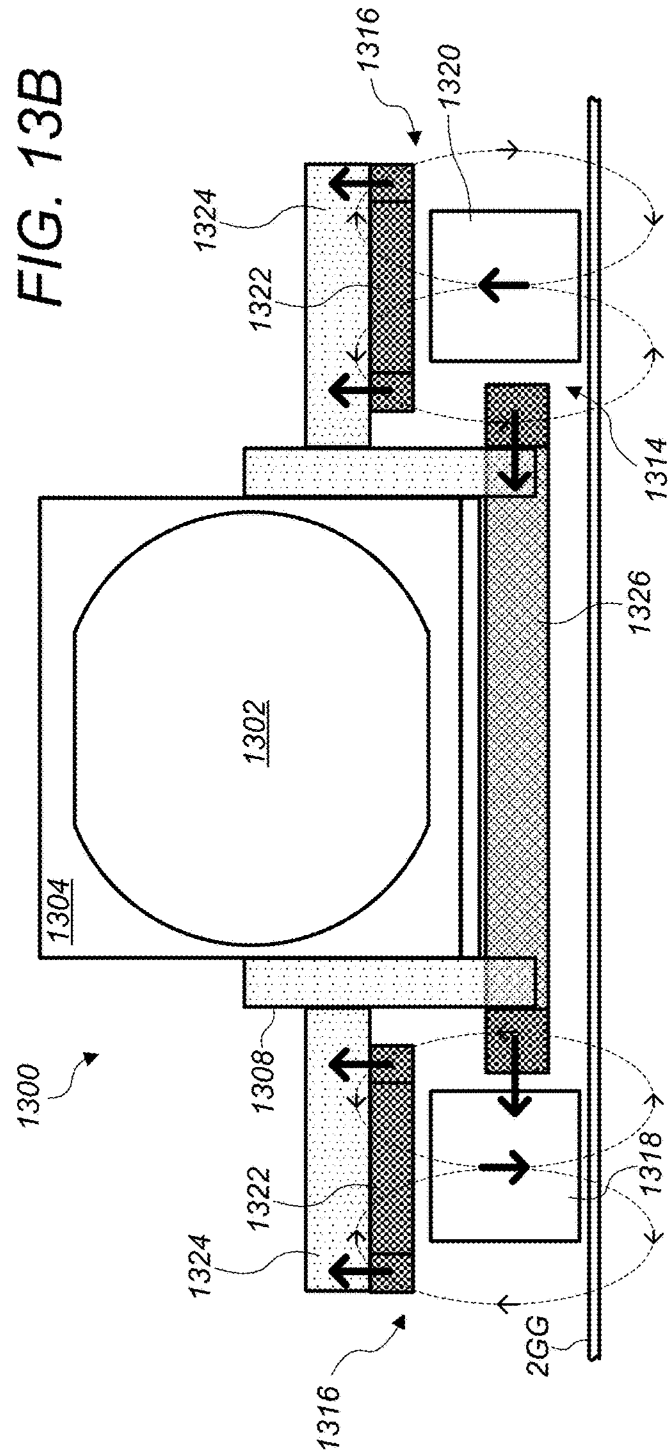

While some actuator arrangements described above may include a respective magnet for each VCM actuator, in some embodiments an actuator arrangement may include one or more magnets that may be shared by multiple VCM actuators. For example, FIGS. 13A-13C each illustrate a respective schematic view of an example actuator arrangement 1300 (e.g., for 3-axis shifting of a lens group within a folded optics arrangement of a camera) that may include such shared magnets. FIG. 13A shows a schematic side view of the actuator arrangement 1300. FIG. 13B shows a schematic top view of the actuator arrangement 1300. FIG. 13C shows a schematic cross-sectional view of the actuator arrangement 1300.

In various embodiments, the camera may include a lens group 1302, a first prism 1304, and a second prism 1306. The lens group 1302 may include one or more lens elements disposed within a lens holder. In various embodiments, the camera may include a carrier structure 1308 and a fixed base structure 1310.

In some embodiments, the actuator arrangement 1300 may include an AF VCM actuator 1312 to provide AF movement. The AF VCM actuator 1312 may be configured like the AF VCM actuator 818 described above with reference to FIGS. 8A-8D.

In some embodiments, the actuator arrangement 1300 may include an OIS-Y VCM actuator 1314 to provide OIS-Y movement. Furthermore, the actuator arrangement 1300 may include OIS-X VCM actuators 1316 to provide OIS-X movement. In some examples, the OIS-Y VCM actuator 1314 and the OIS-X VCM actuators 1316 may share magnets, e.g., as shown in FIG. 13C. In some embodiments, the OIS-Y VCM actuator 1314 may share a first magnet 1318 with a first OIS-X VCM actuator 1316, and the OIS-Y VCM actuator 1314 may share a second magnet 1320 with a second OIS-X VCM actuator 1316 opposite the first OIS-X VCM actuator with respect to the carrier structure 1308. The magnets 1318, 1320 may be coupled to the fixed base structure 1310. Each of the OIS-X VCM actuators 1316 may include a respective OIS-X coil 1322 that is coupled to the carrier structure 1308. In some examples, the OIS-X coils 1322 may be horizontally-oriented racetrack coils. In some embodiments, each of the OIS-X coils 1322 may be attached to a respective protrusion 1324 that extends from the carrier structure 1308 towards the fixed base structure 1310.

In some embodiments, the OIS-Y VCM actuator may include an OIS-Y coil 1326 that is coupled to the carrier structure 1308. For instance, the OIS-Y coil 1326 may be a horizontally-oriented racetrack coil that is attached to the carrier structure 1308 below the lens group 1302. Furthermore, the OIS-Y coil 1326 may surround an outer periphery of the lens group 1302 in some examples.

Figure 14A:
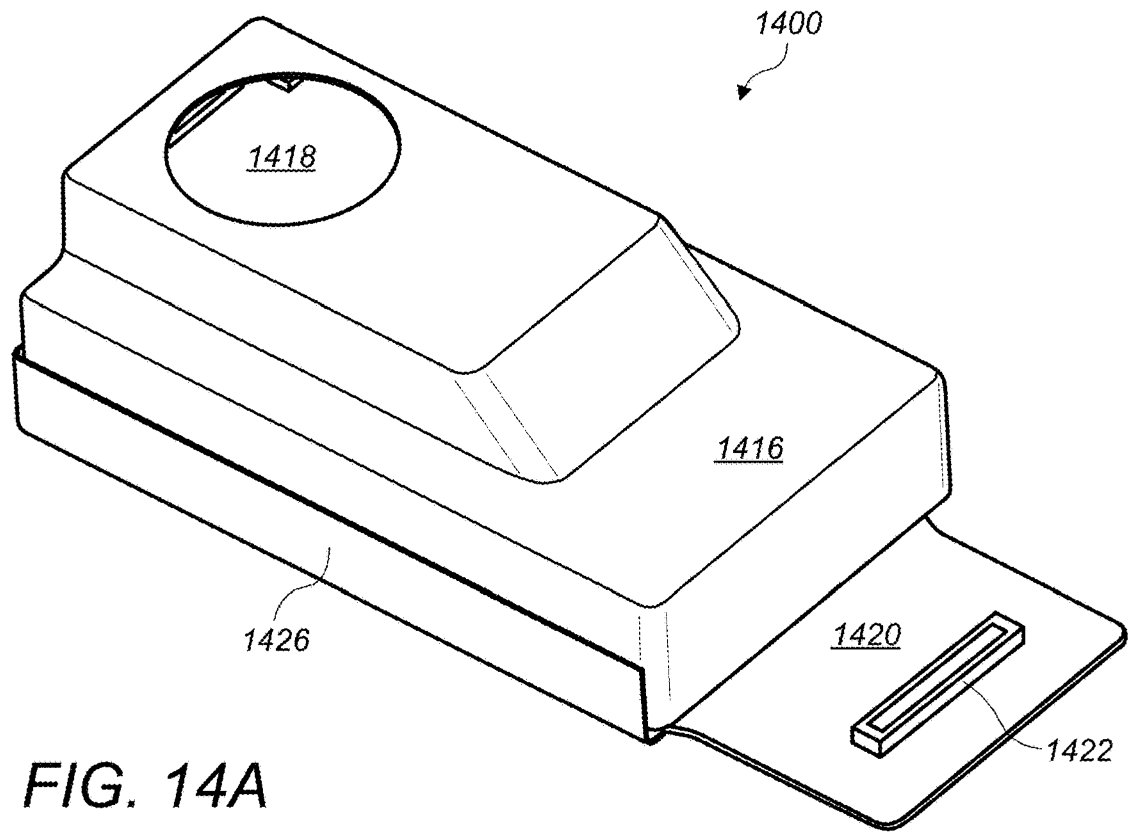
FIGS. 14A and 14B each illustrate a respective perspective view of an example camera with a folded optics arrangement, in accordance with some embodiments.
Figure 14B:
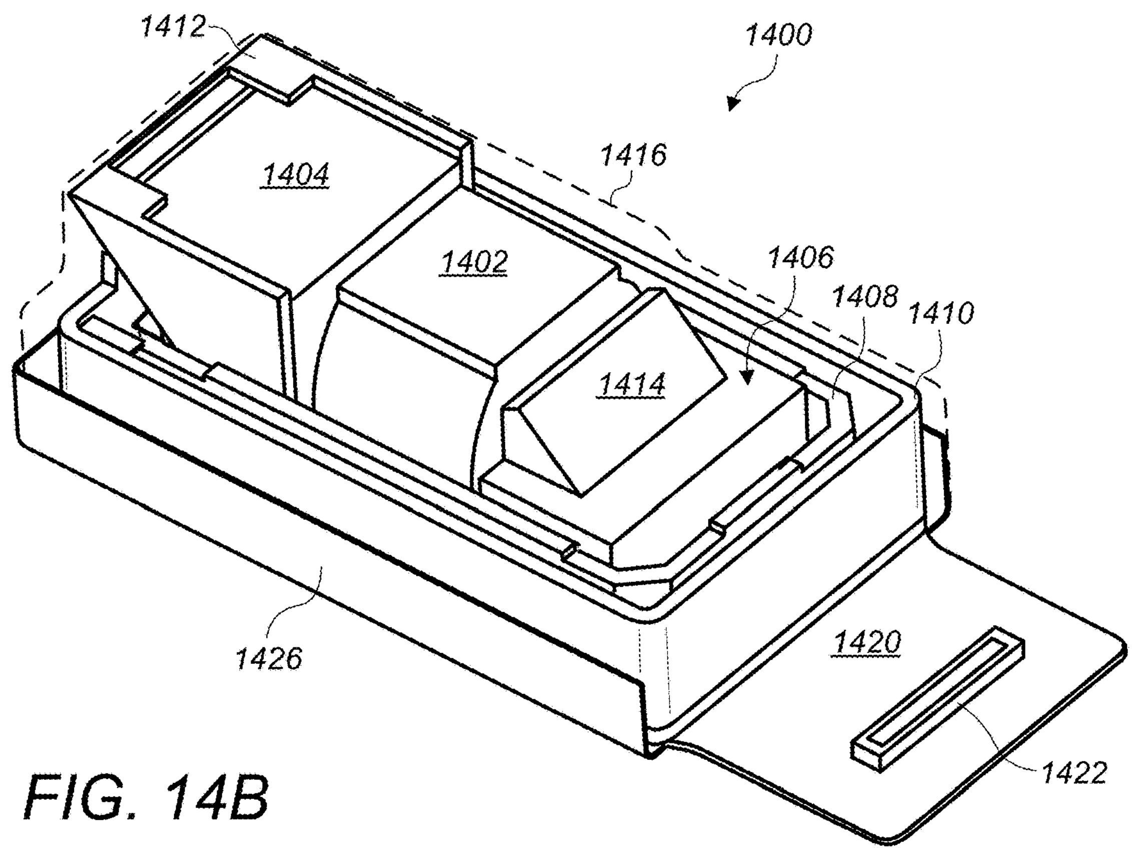

The camera systems described herein may have various components (e.g., the optical elements, the suspension arrangements, and/or the actuator arrangements, etc.) that are at least partially enclosed by a housing (e.g., a shield can). For example, FIG. 14A shows a perspective view of an example camera 1400 with a shield can covering at least a portion of the internal components of the camera 1400. FIG. 14B shows a perspective view of the camera 1400 without the shield covering the internal components.

In some embodiments, the camera 1400 may include a lens group 1402 between a first prism 1404 and a second prism 1406. The lens group 1302 may include one or more lens elements disposed within a lens holder. In various embodiments, the camera 1400 may include a carrier structure 1408 and a fixed base structure 1410.

In some embodiments, the first prism 1404 may be held within a first prism holder 1412. Furthermore, the second prism 1406 may be held within a second prism holder 1414. The camera 1400 may include a shield can 1416 to which the first prism 1404 may be attached via first prism holder 1412, and to which the second prism 1406 may be attached via the second prism holder 1414.

According to various embodiments, the shield can 1416 may define an aperture 1418 above the first prism 1404 such that light may enter the camera 1400 and reach the first prism 1404. In some cases, the aperture 1418 may be enclosed and/or sealed, e.g., via a transparent window. As such, dust particles may be prevented from entering the camera through the aperture 1418 and negatively impacting optical performance of the first prism 1404 and/or other components of the camera 1400 in some instances. Although not illustrated in FIGS. 14A and 14B, the camera 1400 may include one or more openings configured to allow ventilation.

In some embodiments, the camera 1400 may include a flex circuit 1420 disposed below the first prism 1404, the lens group 1402, the second prism 1406, the carrier structure 1408, and/or the fixed base structure 1410. The flex circuit 1420 may include an interface 1422 configured to allow the camera 1400 to interface with one or more other components external to the camera 1400. The flex circuit 1420 may be used to convey data signals and electrical power to and from the camera 1400.

In some embodiments, the camera 1400 may include a stiffener 1426 at least partially below the flex circuit 1420. For instance, the stiffener 1426 may be a folded stiffener, e.g., as shown in FIGS. 14A and 14B. According to some examples, the folded stiffener 1426 may include a base portion below the flex circuit 1420 and tab portions that are each folded from the base portion to cover a respective side of the camera 1400 and/or the shield can 1416. In some cases, the folded stiffener 1426 may include three tab portions, with each tab portion covering a portion of a respective one of three sides of the camera 1400 and/or the shield can 1416. A fourth side of the camera 1400 and/or the shield can 1416 may not have a corresponding tab portion that covers a portion of it. For instance, the fourth side may be a side at which the flex circuit 1420 extends outwardly to one or more components that are external to the camera 1400.

Figure 15:
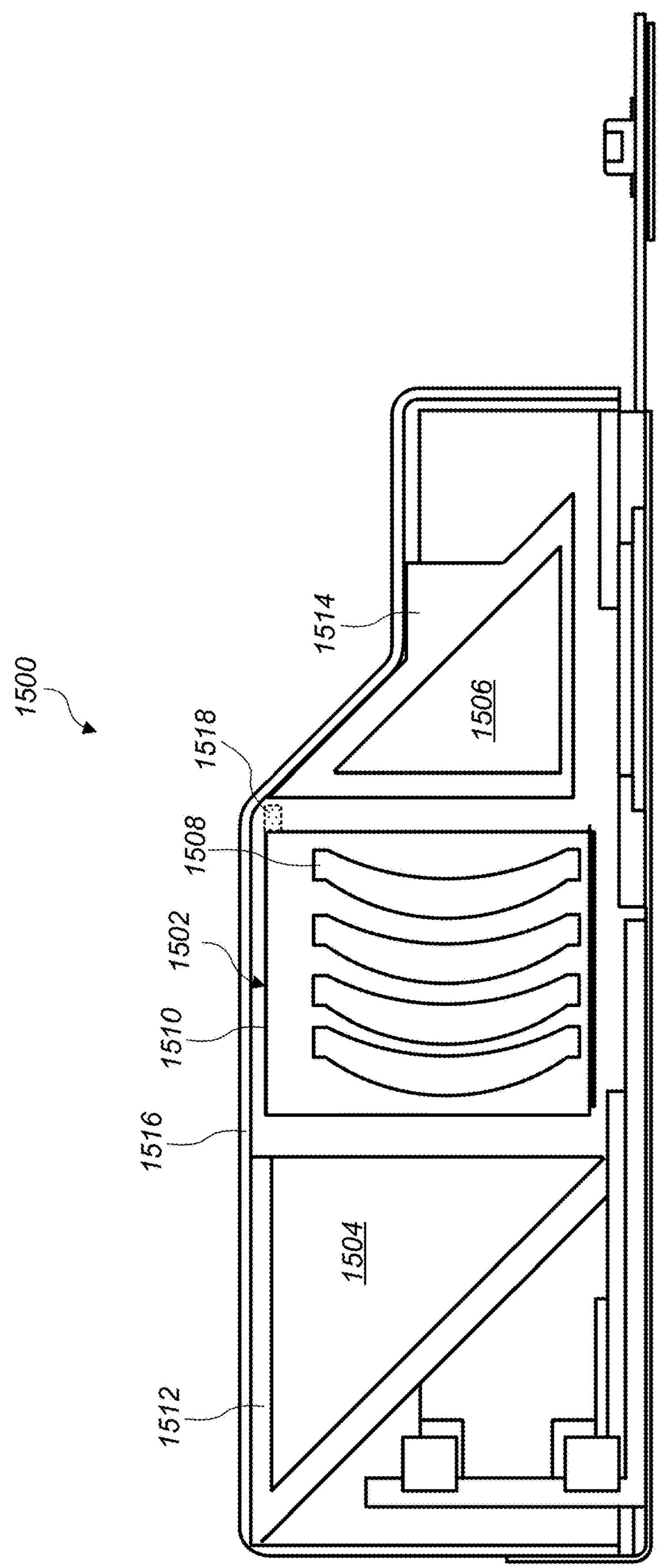
FIG. 15 illustrates a side cross-sectional view of an example camera with a folded optics arrangement, in accordance with some embodiments.

In some embodiments, it may be desirable to distribute the weight of components of a camera system in a manner that avoids undesirable moments (e.g., moments about the center of gravity of the lens group). For example, FIG. 15 illustrates a side cross-sectional view of an example camera 1500 with a folded optics arrangement in which a dense material may be added to provide such weight distribution.

In some embodiments, the camera 1500 may include a lens group 1502 between a first prism 1504 and a second prism 1506. The lens group 1502 may include one or more lens elements 1508 disposed within a lens holder 1510.

In some embodiments, the first prism 1504 may be held within a first prism holder 1512. Furthermore, the second prism 1506 may be held within a second prism holder 1514. The camera 1500 may include a shield can 1516 to which the first prism 1504 may be attached via the first prism holder 1512. In some examples, a top and/or sides of the first prism holder 1512 may be adhered to the shield can 1516. Additionally, the second prism 1506 may be attached to the shield can 1516 via the second prism holder 1514. In some examples, a top and/or sides of the second prism holder 1512 may be adhered to the shield can 1516.

In some cases, the center of gravity of the lens group 1502 may be located such that certain actuator arrangements may cause undesirable moments about the center of gravity. In some cases, to counteract such moments, a dense material 1518 may be attached to the lens holder 1510. For instance, the dense material 1518 may be attached to a top portion of the lens holder 1510, e.g., as indicated in FIG. 15. In some embodiments, the dense material 1518 may not be attached to the lens holder 1510, but rather the dense material 1518 may be part of (e.g., formed integrally with) the lens holder 1510.

Figure 16:
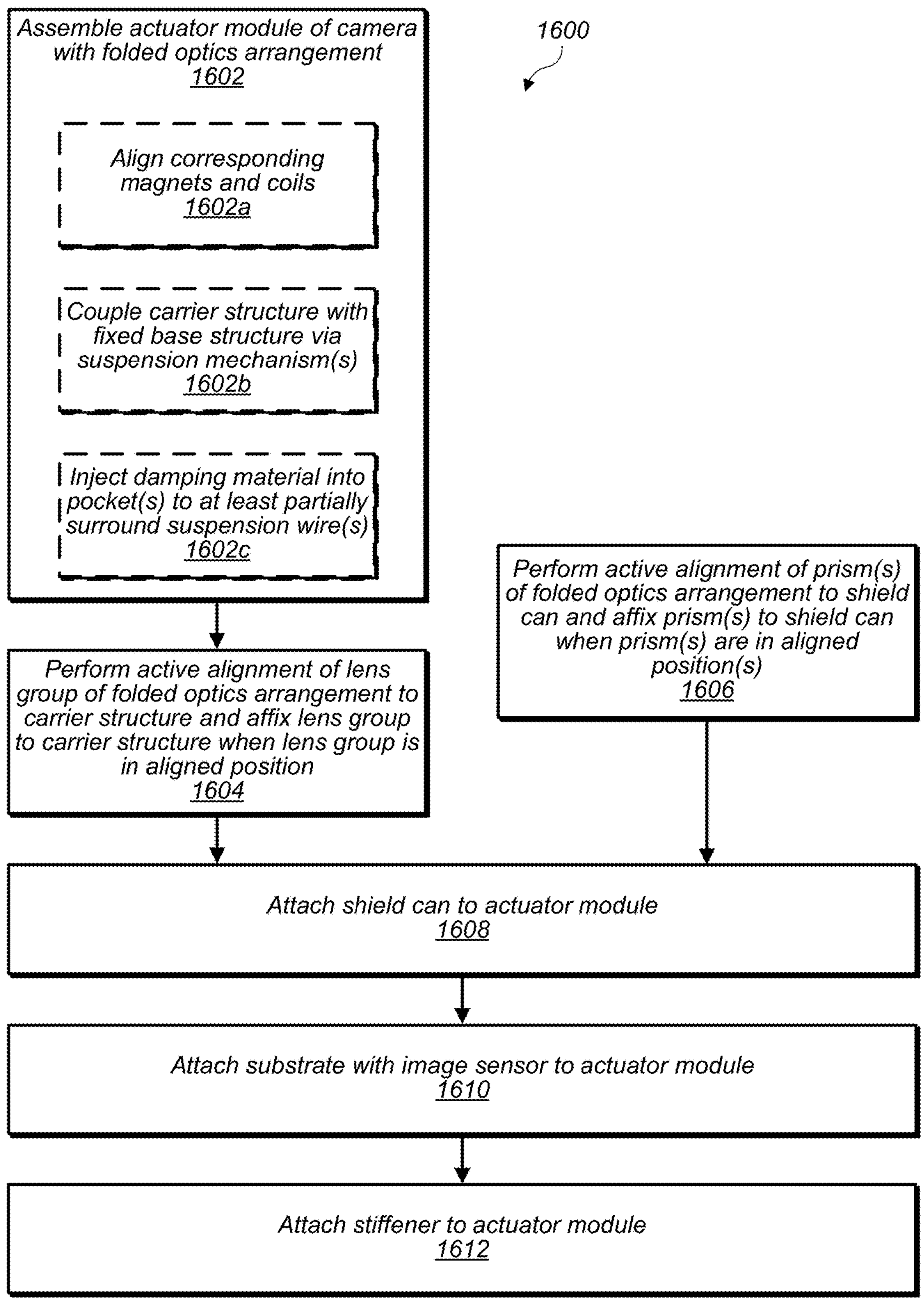
FIG. 16 is a flow chart of an example method for assembling a camera with a folded optics arrangement, in accordance with some embodiments.

FIG. 16 is a flow chart of an example method 1600 for assembling a camera with a folded optics arrangement, in accordance with some embodiments.

At 1602, the method 1600 may include assembling an actuator module of a camera with a folded optics arrangement. For instance, at 1602*a*, magnets and coils of VCM actuators may be aligned or otherwise suitably positioned. In some examples, assembling the actuator module may include, at 1602*b*, coupling a carrier structure with a fixed base structure via one or more suspension mechanisms. In some implementations, assembling the actuator module may include, at 1602*c*, injecting damping material (e.g., a viscoelastic gel) into one or more pockets, e.g., to at least partially surround one or more suspension wires.

At 1604, the method 1600 may include performing active alignment of a lens group of the folded optics arrangement to the carrier structure and affixing the lens group to the carrier structure when the lens group is in an aligned position. At 1606, the method 1600 may include performing active alignment of a first prism and/or a second prism of the folded optics arrangement to a shield can and affixing the prisms to the shield can when the prisms are in aligned positions. It should be understood that the active alignment with respect to the lens group may be performed before, after, or contemporaneously with the active alignment performed with respect to the prisms.

At 1608, the method 1600 may include attaching the shield can to the assembled actuator module. At 1610, the method 1600 may include attaching a substrate that is coupled with an image sensor to the actuator module. At 1612, the method 1600 may include attaching a stiffener to the actuator module.

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 17:
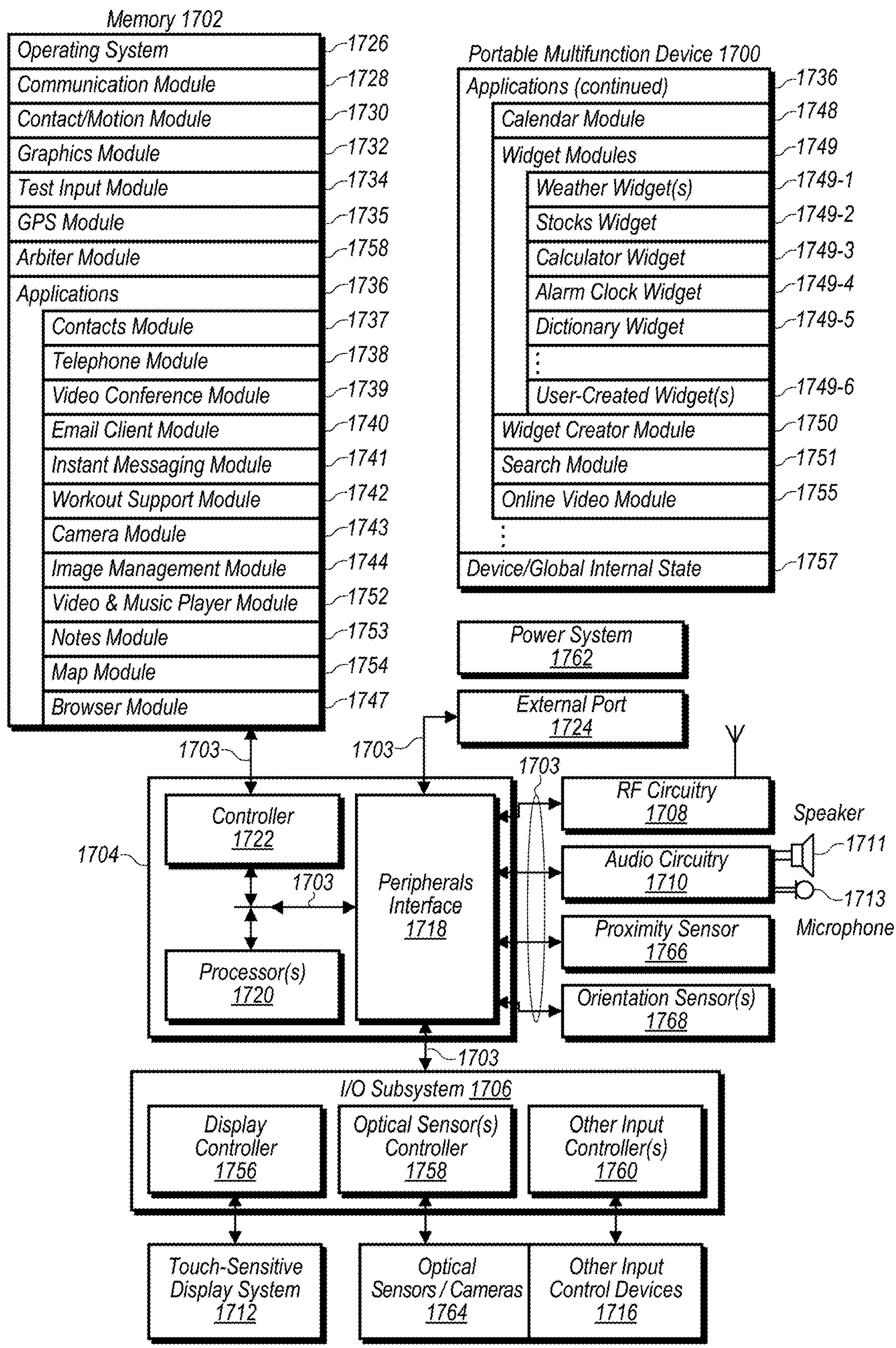
FIG. 17 illustrates a block diagram of a portable multifunction device that may include a camera with a folded optics arrangement, in accordance with some embodiments.

Attention is now directed toward embodiments of portable devices with cameras. FIG. 17 illustrates a block diagram of an example portable multifunction device 1700 that may include one or more cameras (e.g., the cameras described above with reference to FIGS. 1-16), in accordance with some embodiments. Cameras 1764 are sometimes called "optical sensors" for convenience, and may also be known as or called an optical sensor system. Device 1700 may include memory 1702 (which may include one or more computer readable storage mediums), memory controller 1722, one or more processing units (CPUs) 1720, peripherals interface 1718, RF circuitry 1708, audio circuitry 1710, speaker 1711, touch-sensitive display system 1712, microphone 1713, input/output (I/O) subsystem 1706, other input or control devices 1716, and external port 1724. Device 1700 may include multiple optical sensors 1764. These components may communicate over one or more communication buses or signal lines 1703.

It should be appreciated that device 1700 is only one example of a portable multifunction device, and that device 1700 may have more or fewer components than shown, may combine two or more components, or may have a different configuration or arrangement of the components. The various components shown in FIG. 17 may be implemented in hardware, software, or a combination of hardware and software, including one or more signal processing and/or application specific integrated circuits.

Memory 1702 may include high-speed random access memory and may also include non-volatile memory, such as one or more magnetic disk storage devices, flash memory devices, or other non-volatile solid-state memory devices. Access to memory 1702 by other components of device 1700, such as CPU 1720 and the peripherals interface 1718, may be controlled by memory controller 1722.

Peripherals interface 1718 can be used to couple input and output peripherals of the device to CPU 1720 and memory 1702. The one or more processors 1720 run or execute various software programs and/or sets of instructions stored in memory 1702 to perform various functions for device 1700 and to process data.

In some embodiments, peripherals interface 1718, CPU 1720, and memory controller 1722 may be implemented on a single chip, such as chip 1704. In some other embodiments, they may be implemented on separate chips.

RF (radio frequency) circuitry 1708 receives and sends RF signals, also called electromagnetic signals. RF circuitry 1708 converts electrical signals to/from electromagnetic signals and communicates with communications networks and other communications devices via the electromagnetic signals. RF circuitry 1708 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1708 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1710, speaker 1711, and microphone 1713 provide an audio interface between a user and device 1700. Audio circuitry 1710 receives audio data from peripherals interface 1718, converts the audio data to an electrical signal, and transmits the electrical signal to speaker 1711. Speaker 1711 converts the electrical signal to human-audible sound waves. Audio circuitry 1710 also receives electrical signals converted by microphone 1713 from sound waves. Audio circuitry 1710 converts the electrical signal to audio data and transmits the audio data to peripherals interface 1718 for processing. Audio data may be retrieved from and/or transmitted to memory 1702 and/or RF circuitry 1708 by peripherals interface 1718. In some embodiments, audio circuitry 1710 also includes a headset jack (e.g., 1812, FIG. 18). The headset jack provides an interface between audio circuitry 1710 and removable audio input/output peripherals, such as output-only headphones or a headset with both output (e.g., a headphone for one or both ears) and input (e.g., a microphone).

I/O subsystem 1706 couples input/output peripherals on device 1700, such as touch screen 1712 and other input control devices 1716, to peripherals interface 1718. I/O subsystem 1706 may include display controller 1756 and one or more input controllers 1760 for other input or control devices. The one or more input controllers 1760 receive/send electrical signals from/to other input or control devices 1716. The other input control devices 1716 may include physical buttons (e.g., push buttons, rocker buttons, etc.), dials, slider switches, joysticks, click wheels, and so forth. In some alternate embodiments, input controller(s) 1760 may be coupled to any (or none) of the following: a keyboard, infrared port, USB port, and a pointer device such as a mouse. The one or more buttons (e.g., 1208, FIG. 12) may include an up/down button for volume control of speaker 1711 and/or microphone 1713. The one or more buttons may include a push button (e.g., 1806, FIG. 18).

Touch-sensitive display 1712 provides an input interface and an output interface between the device and a user. Display controller 1756 receives and/or sends electrical signals from/to touch screen 1712. Touch screen 1712 displays visual output to the user. The visual output may include graphics, text, icons, video, and any combination thereof (collectively termed "graphics"). In some embodiments, some or all of the visual output may correspond to user-interface objects.

Touch screen 1712 has a touch-sensitive surface, sensor or set of sensors that accepts input from the user based on haptic and/or tactile contact. Touch screen 1712 and display controller 1756 (along with any associated modules and/or sets of instructions in memory 1702) detect contact (and any movement or breaking of the contact) on touch screen 1712 and converts the detected contact into interaction with user-interface objects (e.g., one or more soft keys, icons, web pages or images) that are displayed on touch screen 1712. In an example embodiment, a point of contact between touch screen 1712 and the user corresponds to a finger of the user.

Touch screen 1712 may use LCD (liquid crystal display) technology, LPD (light emitting polymer display) technology, or LED (light emitting diode) technology, although other display technologies may be used in other embodiments. Touch screen 1712 and display controller 1756 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1712. In an example embodiment, projected mutual capacitance sensing technology is used, such as that found in the iPhone®, iPod Touch®, and iPad® from Apple Inc. of Cupertino, California.

Touch screen 1712 may have a video resolution in excess of 800 dpi. In some embodiments, the touch screen has a video resolution of approximately 860 dpi. The user may make contact with touch screen 1712 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1700 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1712 or an extension of the touch-sensitive surface formed by the touch screen.

Device 1700 also includes power system 1762 for powering the various components. Power system 1762 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1700 may also include one or more optical sensors or cameras 1764. FIG. 17 shows an optical sensor 1764 coupled to optical sensor controller 1758 in I/O subsystem 1706. Optical sensor 1764 may include charge-coupled device (CCD) or complementary metal-oxide semiconductor (CMOS) phototransistors. Optical sensor 1764 receives light from the environment, projected through one or more lens, and converts the light to data representing an image. In conjunction with imaging module 1743 (also called a camera module), optical sensor 1764 may capture still images or video. In some embodiments, an optical sensor 1764 is located on the back of device 1700, opposite touch screen display 1712 on the front of the device, so that the touch screen display 1712 may be used as a viewfinder for still and/or video image acquisition. In some embodiments, another optical sensor is located on the front of the device so that the user's image may be obtained for videoconferencing while the user views the other video conference participants on the touch screen display.

Device 1700 may also include one or more proximity sensors 1766. FIG. 17 shows proximity sensor 1766 coupled to peripherals interface 1718. Alternately, proximity sensor 1766 may be coupled to input controller 1760 in I/O subsystem 1706. In some embodiments, the proximity sensor 1766 turns off and disables touch screen 1712 when the multifunction device 1700 is placed near the user's ear (e.g., when the user is making a phone call).

Device 1700 includes one or more orientation sensors 1768. In some embodiments, the one or more orientation sensors 1768 include one or more accelerometers (e.g., one or more linear accelerometers and/or one or more rotational accelerometers). In some embodiments, the one or more orientation sensors 1768 include one or more gyroscopes. In some embodiments, the one or more orientation sensors 1768 include one or more magnetometers. In some embodiments, the one or more orientation sensors 1768 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1700. In some embodiments, the one or more orientation sensors 1768 include any combination of orientation/rotation sensors. FIG. 17 shows the one or more orientation sensors 1768 coupled to peripherals interface 1718. Alternately, the one or more orientation sensors 1768 may be coupled to an input controller 1760 in I/O subsystem 1706. In some embodiments, information is displayed on the touch screen display 1712 in a portrait view or a landscape view based on an analysis of data received from the one or more orientation sensors 1768.

In some embodiments, the software components stored in memory 1702 include operating system 1726, communication module (or set of instructions) 1728, contact/motion module (or set of instructions) 1730, graphics module (or set of instructions) 1732, text input module (or set of instructions) 1734, Global Positioning System (GPS) module (or set of instructions) 1735, arbiter module 1758 and applications (or sets of instructions) 1736. Furthermore, in some embodiments memory 1702 stores device/global internal state 1757. Device/global internal state 1757 includes one or more of: active application state, indicating which applications, if any, are currently active; display state, indicating what applications, views or other information occupy various regions of touch screen display 1712; sensor state, including information obtained from the device's various sensors and input control devices 1716; and location information concerning the device's location and/or attitude.

Operating system 1726 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1728 facilitates communication with other devices over one or more external ports 1724 and also includes various software components for handling data received by RF circuitry 1708 and/or external port 1724. External port 1724 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 1730 may detect contact with touch screen 1712 (in conjunction with display controller 1756) and other touch sensitive devices (e.g., a touchpad or physical click wheel). Contact/motion module 1730 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1730 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1730 and display controller 1756 detect contact on a touchpad.

Contact/motion module 1730 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1732 includes various known software components for rendering and displaying graphics on touch screen 1712 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1732 stores data representing graphics to be used. Each graphic may be assigned a corresponding code. Graphics module 1732 receives, from applications etc., one or more codes specifying graphics to be displayed along with, if necessary, coordinate data and other graphic property data, and then generates screen image data to output to display controller 1756.

Text input module 1734, which may be a component of graphics module 1732, provides soft keyboards for entering text in various applications (e.g., contacts 1737, e-mail 1740, IM 1741, browser 1747, and any other application that needs text input).

GPS module 1735 determines the location of the device and provides this information for use in various applications (e.g., to telephone 1738 for use in location-based dialing, to camera 1743 as picture/video metadata, and to applications that provide location-based services such as weather widgets, local yellow page widgets, and map/navigation widgets).

Applications 1736 may include the following modules (or sets of instructions), or a subset or superset thereof:

- contacts module 1737 (sometimes called an address book or contact list);
- telephone module 1738;
- video conferencing module 1739;
- e-mail client module 1740;
- instant messaging (IM) module 1741;
- workout support module 1742;
- camera module 1743 for still and/or video images;
- image management module 1744;
- browser module 1747;

calendar module 1748;

widget modules 1749, which may include one or more of: weather widget 1749-1, stocks widget 1749-2, calculator widget 1749-3, alarm clock widget 1749-4, dictionary widget 1749-5, and other widgets obtained by the user, as well as user-created widgets 1749-6;

widget creator module 1750 for making user-created widgets 1749-6;

search module 1751;

video and music player module 1752, which may be made up of a video player module and a music player module;

notes module 1753;

map module 1754; and/or online video module 1755.

Examples of other applications 1736 that may be stored in memory 1702 include other word processing applications, other image editing applications, drawing applications, presentation applications, JAVA-enabled applications, encryption, digital rights management, voice recognition, and voice replication.

In conjunction with touch screen 1712, display controller 1756, contact module 1730, graphics module 1732, and text input module 1734, contacts module 1737 may be used to manage an address book or contact list (e.g., stored in application internal state 1757), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1738, video conference 1739, e-mail 1740, or IM 1741; and so forth.

In conjunction with RF circuitry 1708, audio circuitry 1710, speaker 1711, microphone 1713, touch screen 1712, display controller 1756, contact module 1730, graphics module 1732, and text input module 1734, telephone module 1738 may be used to enter a sequence of characters corresponding to a telephone number, access one or more telephone numbers in address book 1737, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1708, audio circuitry 1710, speaker 1711, microphone 1713, touch screen 1712, display controller 1756, optical sensor 1764, optical sensor controller 1758, contact module 1730, graphics module 1732, text input module 1734, contact list 1737, and telephone module 1738, videoconferencing module 1739 includes executable instructions to initiate, conduct, and terminate a video conference between a user and one or more other participants in accordance with user instructions.

In conjunction with RF circuitry 1708, touch screen 1712, display controller 1756, contact module 1730, graphics module 1732, and text input module 1734, e-mail client module 1740 includes executable instructions to create, send, receive, and manage e-mail in response to user instructions. In conjunction with image management module 1744, e-mail client module 1740 makes it very easy to create and send e-mails with still or video images taken with camera module 1743.

In conjunction with RF circuitry 1708, touch screen 1712, display controller 1756, contact module 1730, graphics module 1732, and text input module 1734, the instant messaging module 1741 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1708, touch screen 1712, display controller 1756, contact module 1730, graphics module 1732, text input module 1734, GPS module 1735, map module 1754, and music player module 1746, workout support module 1742 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1712, display controller 1756, optical sensor(s) 1764, optical sensor controller 1758, contact module 1730, graphics module 1732, and image management module 1744, camera module 1743 includes executable instructions to capture still images or video (including a video stream) and store them into memory 1702, modify characteristics of a still image or video, or delete a still image or video from memory 1702.

In conjunction with touch screen 1712, display controller 1756, contact module 1730, graphics module 1732, text input module 1734, and camera module 1743, image management module 1744 includes executable instructions to arrange, modify (e.g., edit), or otherwise manipulate, label, delete, present (e.g., in a digital slide show or album), and store still and/or video images.

In conjunction with RF circuitry 1708, touch screen 1712, display system controller 1756, contact module 1730, graphics module 1732, and text input module 1734, browser module 1747 includes executable instructions to browse the Internet in accordance with user instructions, including searching, linking to, receiving, and displaying web pages or portions thereof, as well as attachments and other files linked to web pages.

In conjunction with RF circuitry 1708, touch screen 1712, display system controller 1756, contact module 1730, graphics module 1732, text input module 1734, e-mail client module 1740, and browser module 1747, calendar module 1748 includes executable instructions to create, display, modify, and store calendars and data associated with calendars (e.g., calendar entries, to do lists, etc.) in accordance with user instructions.

In conjunction with RF circuitry 1708, touch screen 1712, display system controller 1756, contact module 1730, graphics module 1732, text input module 1734, and browser module 1747, widget modules 1749 are mini-applications that may be downloaded and used by a user (e.g., weather widget 549-1, stocks widget 549-2, calculator widget 1749-3, alarm clock widget 1749-4, and dictionary widget 1749-5) or created by the user (e.g., user-created widget 1749-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1708, touch screen 1712, display system controller 1756, contact module 1730, graphics module 1732, text input module 1734, and browser module 1747, the widget creator module 1750 may be used by a user to create widgets (e.g., turning a user-specified portion of a web page into a widget).

In conjunction with touch screen 1712, display system controller 1756, contact module 1730, graphics module 1732, and text input module 1734, search module 1751 includes executable instructions to search for text, music, sound, image, video, and/or other files in memory 1702 that match one or more search criteria (e.g., one or more user-specified search terms) in accordance with user instructions.

In conjunction with touch screen 1712, display system controller 1756, contact module 1730, graphics module 1732, audio circuitry 1710, speaker 1711, RF circuitry 1708, and browser module 1747, video and music player module 1752 includes executable instructions that allow the user to download and play back recorded music and other sound files stored in one or more file formats, such as MP3 or AAC files, and executable instructions to display, present or otherwise play back videos (e.g., on touch screen 1712 or on an external, connected display via external port 1724). In some embodiments, device 1700 may include the functionality of an MP3 player.

In conjunction with touch screen 1712, display controller 1756, contact module 1730, graphics module 1732, and text input module 1734, notes module 1753 includes executable instructions to create and manage notes, to do lists, and the like in accordance with user instructions.

In conjunction with RF circuitry 1708, touch screen 1712, display system controller 1756, contact module 1730, graphics module 1732, text input module 1734, GPS module 1735, and browser module 1747, map module 1754 may be used to receive, display, modify, and store maps and data associated with maps (e.g., driving directions; data on stores and other points of interest at or near a particular location; and other location-based data) in accordance with user instructions.

In conjunction with touch screen 1712, display system controller 1756, contact module 1730, graphics module 1732, audio circuitry 1710, speaker 1711, RF circuitry 1708, text input module 1734, e-mail client module 1740, and browser module 1747, online video module 1755 includes instructions that allow the user to access, browse, receive (e.g., by streaming and/or download), play back (e.g., on the touch screen or on an external, connected display via external port 1724), send an e-mail with a link to a particular online video, and otherwise manage online videos in one or more file formats, such as H.264. In some embodiments, instant messaging module 1741, rather than e-mail client module 1740, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 1702 may store a subset of the modules and data structures identified above. Furthermore, memory 1702 may store additional modules and data structures not described above.

In some embodiments, device 1700 is a device where operation of a predefined set of functions on the device is performed exclusively through a touch screen and/or a touchpad. By using a touch screen and/or a touchpad as the primary input control device for operation of device 1700, the number of physical input control devices (such as push buttons, dials, and the like) on device 1700 may be reduced.

The predefined set of functions that may be performed exclusively through a touch screen and/or a touchpad include navigation between user interfaces. In some embodiments, the touchpad, when touched by the user, navigates device 1700 to a main, home, or root menu from any user interface that may be displayed on device 1700. In such embodiments, the touchpad may be referred to as a "menu button." In some other embodiments, the menu button may be a physical push button or other physical input control device instead of a touchpad.

Figure 18:
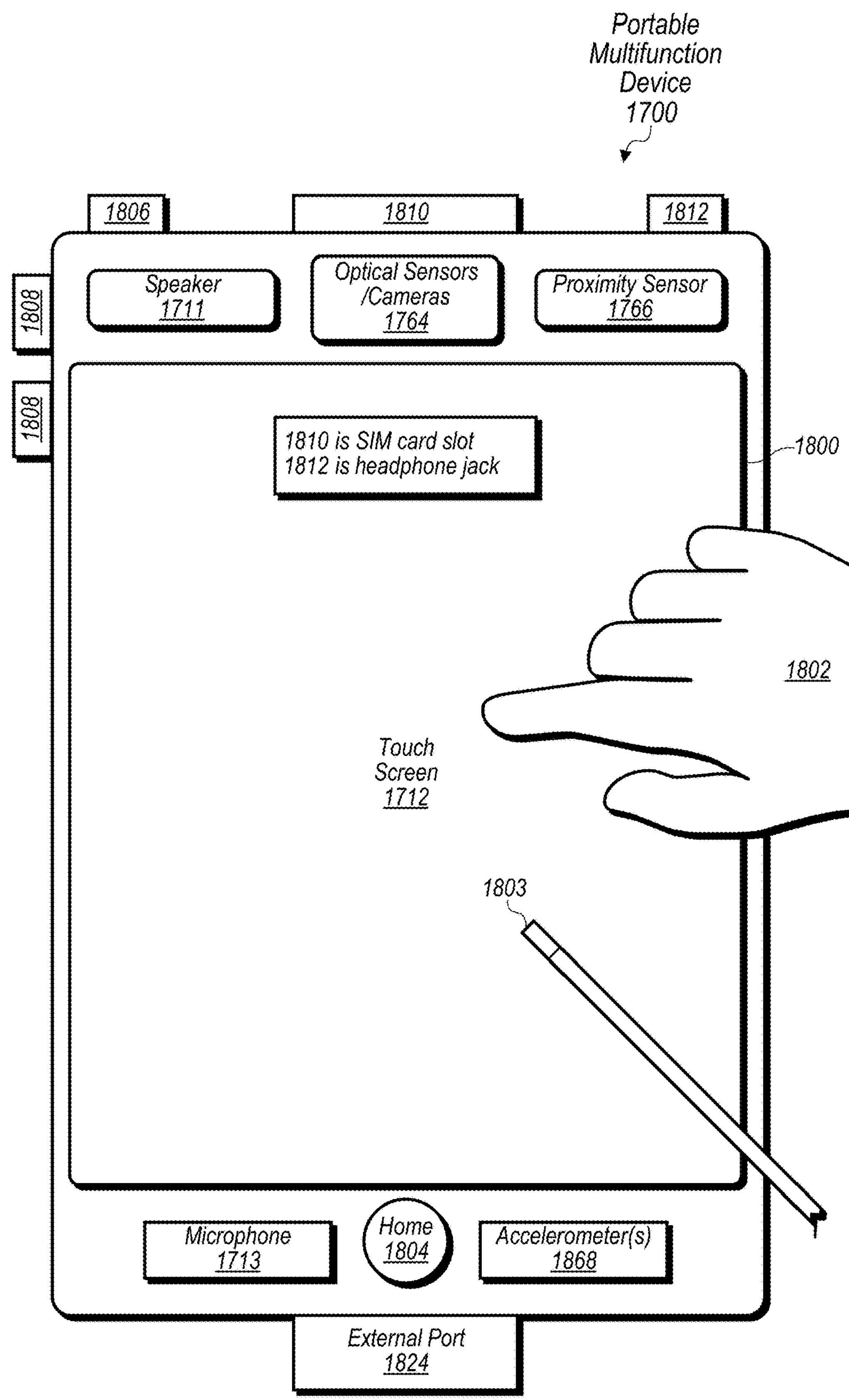
FIG. 18 depicts a portable multifunction device that may include a camera with a folded optics arrangement, in accordance with some embodiments.

FIG. 18 depicts illustrates an example portable multifunction device 1700 that may include one or more cameras (e.g., the cameras described above with reference to FIGS. 1-16), in accordance with some embodiments. The device 1700 may have a touch screen 1702. The touch screen 1718 may display one or more graphics within user interface (UI) 1800. In this embodiment, as well as others described below, a user may select one or more of the graphics by making a gesture on the graphics, for example, with one or more fingers 1802 (not drawn to scale in the figure) or one or more styluses 1803 (not drawn to scale in the figure).

Device 1700 may also include one or more physical buttons, such as "home" or menu button 1804. As described previously, menu button 1804 may be used to navigate to any application 1736 in a set of applications that may be executed on device 1700. Alternatively, in some embodiments, the menu button 1804 is implemented as a soft key in a GUI displayed on touch screen 1712.

In one embodiment, device 1700 includes touch screen 1712, menu button 1804, push button 1806 for powering the device on/off and locking the device, volume adjustment button(s) 1808, Subscriber Identity Module (SIM) card slot 1810, head set jack 1812, and docking/charging external port 1824. Push button 1806 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1700 also may accept verbal input for activation or deactivation of some functions through microphone 1713.

It should be noted that, although many of the examples herein are given with reference to optical sensor(s)/camera(s) 1764 (on the front of a device), one or more rear-facing cameras or optical sensors that are pointed opposite from the display may be used instead of, or in addition to, an optical sensor(s)/camera(s) 1764 on the front of a device.

Example Computer System

Figure 19:
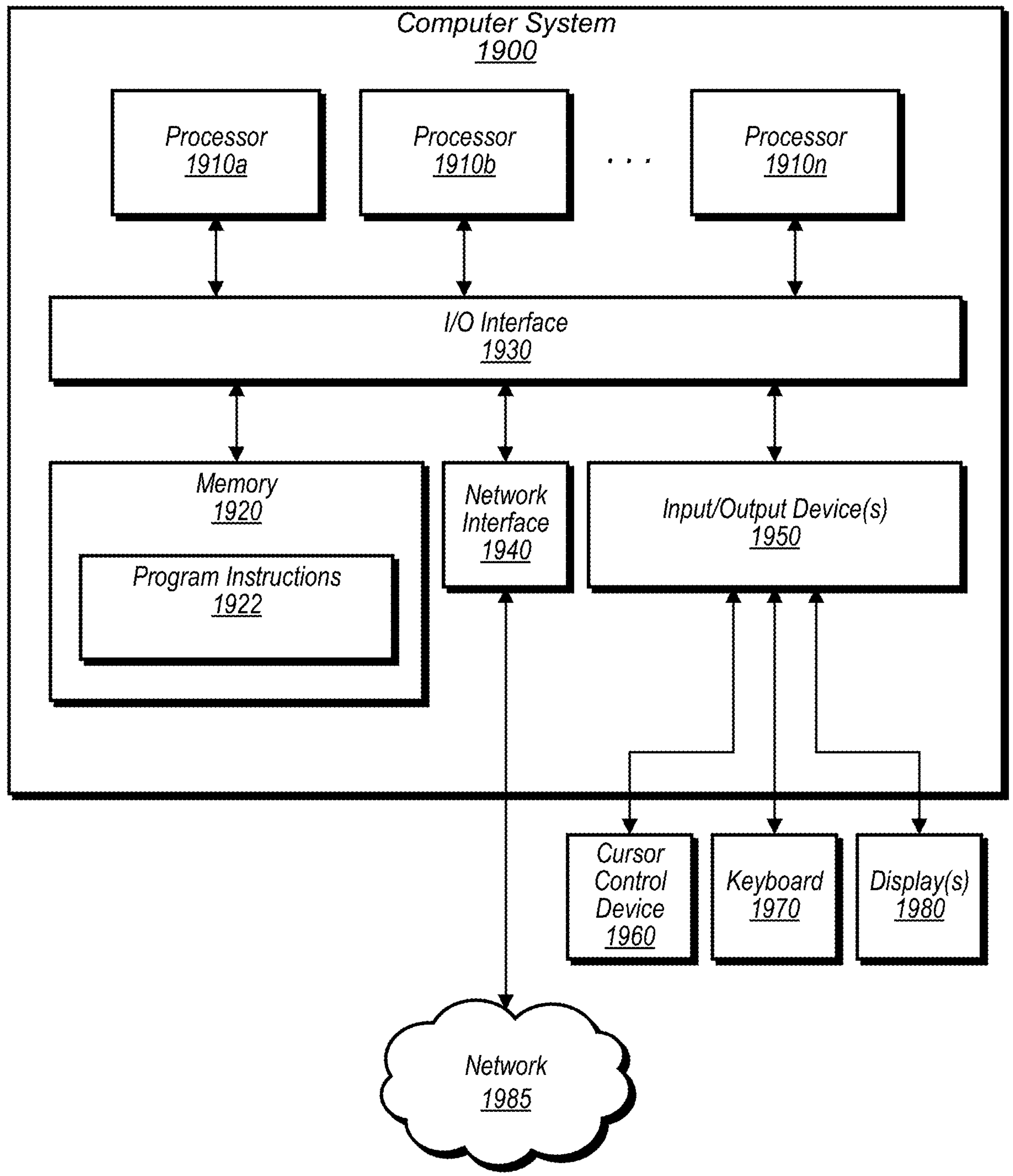
FIG. 19 illustrates an example computer system that may include a camera with a folded optics arrangement, in accordance with some embodiments.

FIG. 19 illustrates an example computer system 1900 that may include one or more cameras (e.g., the cameras described above with reference to FIGS. 1-16), according to some embodiments. The computer system 1900 may be configured to execute any or all of the embodiments described above. In different embodiments, computer system 1900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1900, which may interact with various other devices. Note that any component, action, or functionality described above with respect to FIGS. 1-18 may be implemented on one or more computers configured as computer system 1900 of FIG. 19, according to various embodiments. In the illustrated embodiment, computer system 1900 includes one or more processors 1910 coupled to a system memory 1920 via an input/output (I/O) interface 1930. Computer system 1900 further includes a network interface 1940 coupled to I/O interface 1930, and one or more input/output devices 1950, such as cursor control device 1960, keyboard 1970, and display(s) 1980. In some cases, it is contemplated that embodiments may be implemented using a single instance of computer system 1900, while in other embodiments multiple such systems, or multiple nodes making up computer system 1900, may be configured to host different portions or instances of embodiments. For example, in one embodiment some elements may be implemented via one or more nodes of computer system 1900 that are distinct from those nodes implementing other elements.

In various embodiments, computer system 1900 may be a uniprocessor system including one processor 1910, or a multiprocessor system including several processors 1910 (e.g., two, four, eight, or another suitable number). Processors 1910 may be any suitable processor capable of executing instructions. For example, in various embodiments processors 1910 may be general-purpose or embedded processors implementing any of a variety of instruction set architectures (ISAs), such as the x86, PowerPC, SPARC, or MIPS ISAs, or any other suitable ISA. In multiprocessor systems, each of processors 1910 may commonly, but not necessarily, implement the same ISA.

System memory 1920 may be configured to store camera control program instructions 1922 and/or camera control data accessible by processor 1910. In various embodiments, system memory 1920 may be implemented using any suitable memory technology, such as static random access memory (SRAM), synchronous dynamic RAM (SDRAM), nonvolatile/Flash-type memory, or any other type of memory. In the illustrated embodiment, program instructions 1922 may be configured to implement a lens control application 1924 incorporating any of the functionality described above. Additionally, existing camera control data 1932 of memory 1920 may include any of the information or data structures described above. In some embodiments, program instructions and/or data may be received, sent or stored upon different types of computer-accessible media or on similar media separate from system memory 1920 or computer system 1900. While computer system 1900 is described as implementing the functionality of functional blocks of previous Figures, any of the functionality described herein may be implemented via such a computer system.

In one embodiment, I/O interface 1930 may be configured to coordinate I/O traffic between processor 1910, system memory 1920, and any peripheral devices in the device, including network interface 1940 or other peripheral interfaces, such as input/output devices 1950. In some embodiments, I/O interface 1930 may perform any necessary protocol, timing or other data transformations to convert data signals from one component (e.g., system memory 1920) into a format suitable for use by another component (e.g., processor 1910). In some embodiments, I/O interface 1930 may include support for devices attached through various types of peripheral buses, such as a variant of the Peripheral Component Interconnect (PCI) bus standard or the Universal Serial Bus (USB) standard, for example. In some embodiments, the function of I/O interface 1930 may be split into two or more separate components, such as a north bridge and a south bridge, for example. Also, in some embodiments some or all of the functionality of I/O interface 1930, such as an interface to system memory 1920, may be incorporated directly into processor 1910.

Network interface 1940 may be configured to allow data to be exchanged between computer system 1900 and other devices attached to a network 1985 (e.g., carrier or agent devices) or between nodes of computer system 1900. Network 1985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1950 may, in some embodiments, include one or more display terminals, keyboards, keypads, touchpads, scanning devices, voice or optical recognition devices, or any other devices suitable for entering or accessing data by one or more computer systems 1900. Multiple input/output devices 1950 may be present in computer system 1900 or may be distributed on various nodes of computer system 1900. In some embodiments, similar input/output devices may be separate from computer system 1900 and may interact with one or more nodes of computer system 1900 through a wired or wireless connection, such as over network interface 1940.

As shown in FIG. 19, memory 1920 may include program instructions 1922, which may be processor-executable to implement any element or action described above. In one embodiment, the program instructions may implement the methods described above. In other embodiments, different elements and data may be included. Note that data may include any data or information described above.

Those skilled in the art will appreciate that computer system 1900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1900 may be transmitted to computer system 1900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations.

ADDITIONAL DESCRIPTIONS OF EMBODIMENTS (EXAMPLE CLAUSES)

Clause 1: A camera, comprising: a folded optics arrangement to fold a path of light, the folded optics arrangement comprising: a first prism; a second prism; and a lens group disposed between the first prism and the second prism, wherein the lens group includes one or more lens elements; an image sensor to capture light that has passed through the first prism, the lens group, and the second prism; an actuator module to move the lens group along multiple axes; and a carrier structure that at least partially encircles the folded optics arrangement, wherein the carrier structure is coupled with the lens group such that the carrier structure and the lens group are moveable together relative to the image sensor.

Clause 2: The camera of Clause 1, wherein the actuator module comprises: a first optical image stabilization (OIS) voice coil motor (VCM) actuator to move the lens group to provide OIS movement of an image, captured via the image sensor, in at least a first direction; a second OIS VCM actuator to move the lens group to provide OIS movement of the image in at least a second direction that is orthogonal to the first direction; and an autofocus (AF) VCM actuator to move the lens group to provide AF movement of the image in at least a third direction that is orthogonal to the first direction and the second direction.

Clause 3: The camera of any of Clauses 1-2, wherein: the actuator module comprises: one or more magnets; and one or more coils; the carrier structure comprises an inner frame to which at least one coil of the one or more coils is attached; and the camera further comprises: an outer frame to which at least one magnet of the one or more magnets is attached, wherein the outer frame at least partially encircles the inner frame.

Clause 4: The camera of any of Clauses 1-3, further comprising: a suspension arrangement to suspend the lens group and allow movement of the lens group along the multiple axes, wherein the suspension arrangement comprises: a leaf spring attached to the carrier structure; and suspension wires, wherein a suspension wire of the suspension wires comprises: a first end portion attached to the leaf spring; and a second end portion attached to a fixed structure that is stationary relative to movement of the lens group.

Clause 5: The camera of any of Clauses 1-4, wherein: the first prism and the second prism are positioned along an optical axis defined by the lens group; and the image sensor defines a plane that is parallel to the optical axis.

Clause 6: A device, comprising: one or more processors; memory storing program instructions executable by the one or more processors to control operation of a camera; and the camera, comprising: a folded optics arrangement to fold a path of light, the folded optics arrangement comprising: a first prism; a second prism; and a lens group disposed between the first prism and the second prism, wherein the lens group includes one or more lens elements; an image sensor to capture light that has passed through the first prism, the lens group, and the second prism; an actuator module to move the lens group along multiple axes; and a carrier structure that at least partially encircles the folded optics arrangement, wherein the carrier structure is coupled with the lens group such that the carrier structure and the lens group are moveable together relative to the image sensor.

Clause 7: The device of Clause 6, wherein the one or more processors are further to: cause the actuator module to move the carrier structure, in at least a first direction parallel to an optical axis defined by the lens group, to provide autofocus (AF) movement of an image captured via the image sensor; cause the actuator module to move the carrier structure, in at least a second direction that is orthogonal to the first direction, to provide optical image stabilization movement of the image; and cause the actuator module to move the carrier structure, in at least a third direction that is orthogonal to the first direction and the second direction.

Clause 8: The device of any of Clauses 6-7, wherein: the actuator module comprises: one or more magnets; and one or more coils; the carrier structure comprises an inner frame to which at least one coil of the one or more coils is attached; and the camera further comprises: an outer frame to which at least one magnet of the one or more magnets is attached, wherein the outer frame at least partially encircles the inner frame.

Clause 9: The device of any of Clauses 6-8, wherein: the first prism comprises: an object side through which light enters the first prism; and a first reflecting surface side comprising a first reflective surface to redirect the light towards the lens group; and the second prism comprises: a second reflecting surface side comprising a second reflective surface to redirect the light towards the image sensor; and an image side through which the light exits the first prism, the image side proximate the image sensor.

Clause 10: The device of any of Clauses 6-9, wherein: the first reflecting surface side is angled relative to the object side of the first prism; and the actuator module comprises a voice coil motor (VCM) actuator having at least one magnet and at least one coil disposed within a space under the first reflecting surface side.

Clause 11: The device of any of Clauses 6-10, wherein the VCM actuator comprises an autofocus (AF) actuator to move the carrier structure, in at least a first direction parallel to an optical axis defined by the lens group, to provide AF movement of an image captured via the image sensor.

Clause 12: The device of any of Clauses 6-11, wherein the camera further comprises: a suspension arrangement to suspend the lens group and allow movement of the lens group along the multiple axes, wherein the suspension arrangement comprises: a leaf spring attached to the carrier structure; and suspension wires, wherein a suspension wire of the suspension wires comprises: a first end portion attached to the leaf spring; and a second end portion attached to a fixed structure that is stationary relative to movement of the lens group.

Clause 13: The device of any of Clauses 6-12, wherein: the leaf spring is an upper leaf spring attached to a top surface of the carrier structure, the upper leaf spring extending along a first plane that is parallel to the image sensor; the suspension wire is a first suspension wire that extends from the upper leaf spring in a first direction that is orthogonal to an optical axis defined by the lens group; the suspension arrangement further comprises a lower leaf spring attached to a bottom surface of the carrier structure, the lower leaf spring extending along a second plane that is parallel to the image sensor; and the suspension wires further comprise a second suspension wire that extends from the lower leaf spring in a second direction opposite the first direction.

Clause 14: The device of any of Clauses 6-13, wherein: the carrier structure comprises an inner frame; and the camera further comprises: an outer frame that at least partially encircles the inner frame; and a suspension arrangement to suspend the lens group and allow movement of the lens group along the multiple axes, wherein the suspension arrangement comprises: flexure arms to mechanically connect the inner frame to the outer frame, the flexure arms extending along a plane that is parallel to the image sensor.

Clause 15: The device of any of Clauses 6-14, wherein: the camera further comprises a lens holder to hold the lens group; and the carrier structure is fixedly attached to the lens holder.

Clause 16: A folded optics system, comprising: a lens group including one or more lens elements; a first prism to redirect light to the lens group; a second prism to receive the light from the lens group and redirect the light to an image sensor; an actuator module to move the lens group along multiple axes; and a carrier structure to couple with the lens group such that the carrier structure and the lens group are moveable together relative to the image sensor, wherein the carrier structure is to at least partially encircle the lens group, the first prism, and the second prism.

Clause 17: The folded optics system of Clause 16, wherein the actuator module comprises: a first optical image stabilization (OIS) voice coil motor (VCM) actuator to move the lens group to provide OIS movement of an image, captured via the image sensor, in at least a first direction; a second OIS VCM actuator to move the lens group to provide OIS movement of the image in at least a second direction that is orthogonal to the first direction; and an autofocus (AF) VCM actuator to move the lens group to provide AF movement of the image in at least a third direction that is orthogonal to the first direction and the second direction.

Clause 18: The folded optics system of any of Clauses 16-17, wherein: the actuator module comprises: one or more magnets; and one or more coils; a first portion of the actuator module is attached to the carrier structure; and a second portion of the actuator module is attached to a base structure that is fixed relative to movement of the carrier structure.

Clause 19: The folded optics system of any of Clauses 16-18, wherein: the first prism comprises: an object side through which light enters the first prism; and a first reflecting surface side comprising a first reflective surface to redirect the light to the lens group; the second prism comprises: a second reflecting surface side comprising a second reflective surface to redirect the light to the image sensor; an image side through which the light exits the first prism, the image side proximate the image sensor; the first reflecting surface side is angled relative to the object side of the first prism; and the actuator module comprises a voice coil motor (VCM) actuator having at least one magnet and at least one coil disposed within a space under the first reflecting surface side.

Clause 20: The folded optics system of any of Clauses 16-19, wherein: the lens group is disposed between the first prism and the second prism; and the first prism and the prism are positioned along an optical axis defined by the lens group.

Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
- a folded optics arrangement to fold a path of light, the folded optics arrangement comprising:
  - a first prism;
  - a second prism; and
  - a lens group disposed between the first prism and the second prism, wherein the lens group includes one or more lens elements that define an optical axis;
- an image sensor to capture light that has passed through the first prism, the lens group, and the second prism;
- a carrier structure that at least partially encircles the folded optics arrangement, wherein the carrier structure is coupled with the lens group such that the carrier structure and the lens group are moveable together relative to the image sensor; and
- an actuator to move the lens group along multiple axes, wherein the actuator comprises:
  - a first set of one or more coils attached to the carrier structure and a first set of one or more magnets configured stationary with respect to the image sensor, wherein the first set of one or more coils and the first set of one or more magnets are configured to move the carrier structure and the lens group in one or more directions orthogonal to the optical axis; and a second set of one or more coils attached to the carrier structure and a second set of one or more magnets configured stationary with respect to the image sensor, wherein the second set of one or more coils and the second set of one or more magnets are configured to move the carrier structure and the lens group along the optical axis.

2. The camera of claim 1, wherein the actuator comprises:

a first optical image stabilization (OIS) voice coil motor (VCM) that comprises a first portion of the first set of coils and a first portion of the first set of magnets, wherein the first OIS VCM is configured to move the lens group in at least a first direction orthogonal to the optical axis; and a second OIS VCM that comprises a second portion of the first set of coils and a second portion of the first set of magnets, wherein the second OIS VCM is configured to move the lens group in at least a second direction that is orthogonal to the first direction and orthogonal to the optical axis.

3. The camera of claim 1, wherein:

the carrier structure comprises an inner frame to which at least one coil of the one or more coils is attached.

4. The camera of claim 3, wherein the camera further comprises:

an outer frame to which at least one magnet of the one or more magnets is attached, wherein the outer frame at least partially encircles the inner frame.

5. The camera of claim 4, further comprising:

a suspension arrangement to suspend the lens group and allow movement of the lens group along the multiple axes.

6. The camera of claim 5, wherein the suspension arrangement comprises:

a leaf spring attached to the carrier structure; and suspension wires, wherein a suspension wire of the suspension wires comprises:

a first end portion attached to the leaf spring; and a second end portion attached to a fixed structure that is stationary relative to movement of the lens group.

7. The camera of claim 5, wherein the suspension arrangement comprises:

flexure arms to mechanically connect the inner frame to the outer frame, the flexure arms extending along a plane that is parallel to the image sensor.

8. A device, comprising:

one or more processors;

memory storing program instructions executable by the one or more processors to control operation of a camera; and the camera, comprising:

a folded optics arrangement to fold a path of light, the folded optics arrangement comprising:

a first prism;

a second prism; and a lens group disposed between the first prism and the second prism, wherein the lens group includes one or more lens elements that define an optical axis;

an image sensor to capture light that has passed through the first prism, the lens group, and the second prism;

a carrier structure that at least partially encircles the folded optics arrangement, wherein the carrier structure is coupled with the lens group such that the carrier structure and the lens group are moveable together relative to the image sensor; and an actuator to move the lens group along multiple axes, wherein the actuator comprises:

a first set of one or more coils attached to the carrier structure and a first set of one or more magnets configured stationary with respect to the image sensor, wherein the first set of one or more coils and the first set of one or more magnets are configured to move the carrier structure and the lens group in one or more directions orthogonal to the optical axis; and a second set of one or more coils attached to the carrier structure and a second set of one or more magnets configured stationary with respect to the image sensor, wherein the second set of one or more coils and the second set of one or more magnets are configured to move the carrier structure and the lens group along the optical axis.

9. The device of claim 8, wherein the actuator comprises:

a first optical image stabilization (OIS) voice coil motor (VCM) that comprises a first portion of the first set of coils and a first portion of the first set of magnets, wherein the first OIS VCM is configured to move the lens group in at least a first direction orthogonal to the optical axis; and a second OIS VCM that comprises a second portion of the first set of coils and a second portion of the first set of magnets, wherein the second OIS VCM is configured to move the lens group in at least a second direction that is orthogonal to the first direction and orthogonal to the optical axis.

10. The device of claim 8, wherein:

the carrier structure comprises an inner frame to which at least one coil of the one or more coils is attached.

11. The device of claim 10, wherein the camera further comprises:

an outer frame to which at least one magnet of the one or more magnets is attached, wherein the outer frame at least partially encircles the inner frame.

12. The device of claim 11, wherein the camera further comprises:

a suspension arrangement to suspend the lens group and allow movement of the lens group along the multiple axes.

13. The device of claim 12, wherein the suspension arrangement comprises:

a leaf spring attached to the carrier structure; and suspension wires, wherein a suspension wire of the suspension wires comprises:

a first end portion attached to the leaf spring; and a second end portion attached to a fixed structure that is stationary relative to movement of the lens group.

14. The device of claim 12, wherein the suspension arrangement comprises:

flexure arms to mechanically connect the inner frame to the outer frame, the flexure arms extending along a plane that is parallel to the image sensor.

15. A system, comprising:

a carrier structure, wherein the carrier structure is coupled with a lens group that includes one or more lens elements that define an optical axis such that the carrier structure and the lens group are moveable together relative to an image sensor configured to capture light that has passed through the lens group; and an actuator to move the lens group along multiple axes, wherein the actuator comprises:

a first set of one or more coils attached to the carrier structure and a first set of one or more magnets configured stationary with respect to the image sensor, wherein the first set of one or more coils and the first set of one or more magnets are configured to move the carrier structure and the lens group in one or more directions orthogonal to the optical axis; and a second set of one or more coils attached to the carrier structure and a second set of one or more magnets configured stationary with respect to the image sensor, wherein the second set of one or more coils and the second set of one or more magnets are configured to move the carrier structure and the lens group along the optical axis.

16. The system of claim 15, wherein the actuator comprises:

a first optical image stabilization (OIS) voice coil motor (VCM) that comprises a first portion of the first set of coils and a first portion of the first set of magnets, wherein the first OIS VCM is configured to move the lens group in at least a first direction orthogonal to the optical axis; and a second OIS VCM that comprises a second portion of the first set of coils and a second portion of the first set of magnets, wherein the second OIS VCM is configured to move the lens group in at least a second direction that is orthogonal to the first direction and orthogonal to the optical axis.

17. The system of claim 15, wherein:

the carrier structure comprises an inner frame to which at least one coil of the one or more coils is attached.

18. The system of claim 17, further comprising:

an outer frame to which at least one magnet of the one or more magnets is attached, wherein the outer frame at least partially encircles the inner frame.

19. The system of claim 15, further comprising:

a suspension arrangement to suspend the lens group and allow movement of the lens group along the multiple axes.

20. The system of claim 19, wherein the suspension arrangement comprises:

a leaf spring attached to the carrier structure; and suspension wires, wherein a suspension wire of the suspension wires comprises:

a first end portion attached to the leaf spring; and a second end portion attached to a fixed structure that is stationary relative to movement of the lens group.

* * * * *